(12) United States Patent
Zhang

(10) Patent No.: US 12,198,379 B2
(45) Date of Patent: Jan. 14, 2025

(54) SYSTEMS AND METHODS FOR IMAGE SEGMENTATION

(71) Applicant: SHANGHAI UNITED IMAGING HEALTHCARE CO., LTD., Shanghai (CN)

(72) Inventor: Wei Zhang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 387 days.

(21) Appl. No.: 17/655,170

(22) Filed: Mar. 16, 2022

(65) Prior Publication Data

US 2022/0301224 A1  Sep. 22, 2022

(30) Foreign Application Priority Data

Mar. 16, 2021  (CN) .................. 202110279106.X

(51) Int. Cl.
*G06T 7/73* (2017.01)
*G06T 7/00* (2017.01)
*G06T 7/174* (2017.01)

(52) U.S. Cl.
CPC .............. *G06T 7/75* (2017.01); *G06T 7/0016* (2013.01); *G06T 7/174* (2017.01);
(Continued)

(58) Field of Classification Search
CPC ......... G06T 7/75; G06T 7/0016; G06T 7/174; G06T 2207/10072; G06T 2207/20084; G06T 2207/30196; G06T 2207/10081; G06T 2207/10088; G06T 2207/10104;
G06T 2207/10108; G06T 2207/10116; G06T 2207/20021; G06T 2207/20081; G06T 2207/20116; G06T 2207/30096; G06T 7/11; G06N 3/04; G06N 3/08; G16H 30/20
(Continued)

(56) References Cited

U.S. PATENT DOCUMENTS

| 2018/0061058 A1 | 3/2018 | Xu et al. |
| 2018/0315188 A1 | 11/2018 | Tegzes et al. |
| 2019/0130578 A1 | 5/2019 | Gulsun et al. |

FOREIGN PATENT DOCUMENTS

| CN | 107403201 A | 11/2017 |
| CN | 107437249 A | 12/2017 |

(Continued)

OTHER PUBLICATIONS

Zhou, "One-pass Multi-task Networks with Cross-task Guided Attention for Brain Tumor Segmentation" (Year: 2019).*
(Continued)

*Primary Examiner* — Juan A Torres
(74) *Attorney, Agent, or Firm* — METIS IP LLC

(57) ABSTRACT

The present disclosure provides methods and systems for image segmentation. The methods may include obtaining an initial image. The methods may include determining, based on the initial image, at least one target image using a positioning model. Each of the at least one target image may include a portion of a target region. The methods may further include, for the each of the at least one target image, determining an initial segmentation result of the portion of the target region using a segmentation model.

20 Claims, 14 Drawing Sheets

(52) U.S. Cl.
CPC ............... *G06T 2207/10072* (2013.01); *G06T 2207/20084* (2013.01); *G06T 2207/30196* (2013.01)

(58) Field of Classification Search
USPC ........................................................ 382/128
See application file for complete search history.

(56) References Cited

FOREIGN PATENT DOCUMENTS

| | | |
|---|---|---|
| CN | 108447551 A | 8/2018 |
| CN | 108460813 A | 8/2018 |
| CN | 109360208 A | 2/2019 |
| CN | 110136828 A | 8/2019 |
| CN | 110517254 A | 11/2019 |
| CN | 110838108 A | 2/2020 |
| CN | 111160367 A | 5/2020 |
| CN | 111161275 A | 5/2020 |
| CN | 111354002 A | 6/2020 |
| CN | 111429459 A | 7/2020 |
| CN | 111738989 A | 10/2020 |
| CN | 112396606 A | 2/2021 |

OTHER PUBLICATIONS

Long, "Fully Convolutional Networks for Semantic Segmentation" (Year: 2014).*
Ronneberger, "U-Net, Convolutional Networks for Biomedical Image Segmentation", (Year: 2015).*
Zhou, "Unet + +: A cyclostyle u-net architecture for medical segmentation" (Year: 2018).*
Guan, "Fully Dense UNet for 2D Sparse Photoacoustic Tomography Artifact Removal", (Year: 2019).*
Huang, "Densely connected convolutional networks" (Year: 2017).*
Heller, "KiTS19 Challenge Data: 300 Kidney Tumor Cases with Clinical Context, CT Semantic Segmentations, and Surgical Outcomes", (Year: 2019).*
First Office Action in Chinese Application No. 202110279106.X mailed on Jul. 1, 2022, 26 pages.
Yan, Wenjie, Research of Lung Segmentation in CT Image Based on Deep Learning, Chinese Doctoral Dissertations & Master's Theses Full-Text Databases, 2020, 51 pages.
Zuo, Zhenyu, Medical Image Segmentation, Registration, Fusion, and Denoising Based on Machine Learning, Electronic Design Engineering, 27(17): 135-139, 2019.

* cited by examiner

SYSTEMS AND METHODS FOR IMAGE SEGMENTATION

CROSS-REFERENCE TO RELATED APPLICATIONS

This application claims priority of Chinese Patent Application No. 202110279106.X, filed on Mar. 16, 2021, the contents of which are hereby incorporated by reference.

TECHNICAL FIELD

The present disclosure generally relates to the field of image processing, and more particularly, relates to methods, systems, and devices for image segmentation.

BACKGROUND

With the development of computer technology, images, as a direct and rich information carrier, have become an important source and means for human beings to obtain and use information. Image segmentation is an important technique in image processing, which is widely used in fields, such as medical, commercial, entertainment, etc. For example, ranges of target volumes may be segmented from medical images for radiotherapy. As another example, human faces may be segmented from intelligent surveillance images for face recognition. However, segmentation of complex images (e.g., three-dimensional (3D) images) with large data volumes and/or images with blurred boundaries between segmented regions and background regions often take a relatively long time, which is extremely inefficient. Therefore, it is desirable to provide systems and methods for image segmentation with high accuracy and high speed.

SUMMARY

An aspect of the present disclosure provides a method for image segmentation. The method may be implemented on a computing device including at least one processor and at least one storage device. The method may include obtaining an initial image. The method may include determining, based on the initial image, at least one target image using a positioning model. Each of the at least one target image may include a portion of a target region. The method may further include, for the each of the at least one target image, determining an initial segmentation result of the portion of the target region using a segmentation model.

In some embodiments, the initial image may be obtained based on at least one of a computed tomography (CT) scanner, a positron emission tomography (PET) scanner, or a magnetic resonance (MR) scanner.

In some embodiments, the initial image may include a two-dimensional (2D) image, the at least one target image including a 2D image block of the 2D image. Alternatively, the initial image may include a 3D image, the at least one target image including a 3D image block of the 3D image.

In some embodiments, the determining, based on the initial image, at least one target image using a positioning model may include determining a plurality of sub-images of the initial image; obtaining a plurality of preprocessed sub-images by preprocessing the plurality of sub-images, respectively, the preprocessing including at least one of image normalization or image resample; and determining the at least one target image from the plurality of preprocessed sub-images using the positioning model.

In some embodiments, the determining a plurality of sub-images of the initial image may include determining at least one feature parameter based on at least one feature of the target region; and obtaining, based on the at least one feature parameter, the plurality of sub-images from the initial image.

In some embodiments, the positioning model may include a machine learning-based classification model.

In some embodiments, the segmentation model may include a neural network-based deep learning model.

In some embodiments, the segmentation model may include at least one of a 2D convolutional segmentation model or a 3D segmentation model.

In some embodiments, the method may further include determining a target segmentation result of the target region based on the at least one initial segmentation result.

In some embodiments, the positioning model may be determined according to a first training process. The first training process may include obtaining a plurality of first training samples, each of the plurality of first training samples including a first sample sub-image and a first sample label, the first sample label being configured to indicate whether the first sample sub-image includes a portion of a sample region; and training an initial positioning model according to an iterative operation including one or more iterations, and in at least one of the one or more iterations. The first training process may further include obtaining an updated positioning model generated in a previous iteration; for the each of the plurality of first training samples, obtaining a determination result of whether the first sample sub-image includes the portion of the sample region using the initial positioning model; and updating at least one first model parameter of the updated positioning model based on a first difference between the determination result and the first sample label, or designating the updated positioning model as the positioning model based on the first difference.

In some embodiments, the segmentation model may be determined according to a second training process. The second training process may include obtaining a plurality of second training samples, each of the plurality of second training samples including a second sample sub-image and a second sample label, the second sample sub-image including a portion of a sample region, the second sample label including a sample segmentation result of the portion of the sample region; and training an initial segmentation model according to an iterative operation including one or more iterations, and in at least one of the one or more iterations. The second training process may further include obtaining an updated segmentation model generated in a previous iteration; for the each of the plurality of second training samples, obtaining a predicted segmentation result for the portion of the sample region included in the second sample sub-image using the updated segmentation model; and updating at least one second model parameter of the updated segmentation model based on a second difference between the predicted segmentation result and the second sample label, or designating the updated segmentation model as the segmentation model based on the second difference.

In some embodiments, the positioning model may be obtained by training based on a plurality of first training samples, the segmentation model may be obtained by training based on a plurality of second training samples, and the plurality of first training samples and the plurality of second training samples may be obtained based on a plurality of sample sub-images of a sample initial image.

In some embodiments, the plurality of first training samples and the plurality of second training samples may be obtained by obtaining the plurality of sample sub-images, the plurality of sample sub-images including one or more first sub-images and one or more second sub-images, each of the one or more first sub-images including no sample region, each of the one or more second sub-images including a portion of the sample region and a segmentation result of the portion of the sample region; preprocessing the plurality of sample sub-images, respectively; and determining the plurality of first training samples and the plurality of second training samples from the plurality of preprocessed sample sub-images.

In some embodiments, the plurality of first training samples and the plurality of second training samples may be obtained by obtaining the plurality of sample sub-images, the plurality of sample sub-images including one or more first sub-images and one or more second sub-images, each of the one or more first sub-images including no sample region, each of the one or more second sub-images including a portion of the sample region and a segmentation result of the portion of the sample region; obtaining at least one data feature of each of the plurality of sample sub-images by performing feature extraction on an image data distribution and/or a sample region distribution of the plurality of sample sub-images, respectively; determining, based on the data features, at least one first sub-image for training from the one or more first sub-images and at least one second sub-image for training from the one or more second sub-images; preprocessing the at least one first sub-image for training and the at least one second sub-image for training, respectively, the preprocessing including at least one of image normalization or image resampling; and designating the at least one preprocessed first sub-image for training and/or the at least one preprocessed second sub-image for training as the plurality of first training samples; designating the at least one preprocessed second sub-image for training as the plurality of second training samples.

Another aspect of the present disclosure provides a method for image segmentation. The method may be implemented on a computing device including at least one processor and at least one storage device. The method may include obtaining an initial image; and determining, based on the initial image, using a fusion model, at least one target image each of which including a portion of a target region, and an initial segmentation result of the portion of the target region for each of the at least one target image, the fusion model being obtained based on multi-task learning.

In some embodiments, the fusion model may include a machine learning model.

In some embodiments, the fusion model may include a positioning sub-model and a segmentation sub-model, and the positioning sub-model and the segmentation sub-model may share a portion of model weights.

In some embodiments, the fusion model may be configured to determine the at least one target image by classifying, using the positioning sub-model, a plurality of sub-images of the initial image; obtain a plurality of initial segmentation results by segmenting, using the segmentation sub-model, the plurality of sub-images; and determine a target segmentation result of the target region based on the at least one target image and the plurality of initial segmentation results.

In some embodiments, the method may further include determining a target segmentation result of the target region based on the at least one initial segmentation result.

Still another aspect of the present disclosure provides a system for image segmentation. The system may include at least one storage device storing a set of instructions; and at least one processor in communication with the storage device, wherein when executing the set of instructions, the at least one processor is configured to cause the system to perform operations. The operations may include obtaining an initial image; determining, based on the initial image, at least one target image using a positioning model, each of the at least one target image including a portion of a target region; and for the each of the at least one target image, determining an initial segmentation result of the portion of the target region using a segmentation model.

Still another aspect of the present disclosure provides a system for image segmentation. The system may include at least one storage device storing a set of instructions; and at least one processor in communication with the storage device, wherein when executing the set of instructions, the at least one processor is configured to cause the system to perform operations. The operations may include obtaining an initial image; and determining, based on the initial image, using a fusion model, at least one target image each of which including a portion of a target region, and an initial segmentation result of the portion of the target region for each of the at least one target image, the fusion model being obtained based on multi-task learning.

Still another aspect of the present disclosure provides a non-transitory computer readable medium storing instructions, the instructions, when executed by at least one processor, causing the at least one processor to implement a method for image segmentation. The method may include obtaining an initial image; determining, based on the initial image, at least one target image using a positioning model, each of the at least one target image including a portion of a target region; and for the each of the at least one target image, determining an initial segmentation result of the portion of the target region using a segmentation model.

Still another aspect of the present disclosure provides a non-transitory computer readable medium storing instructions, the instructions, when executed by at least one processor, causing the at least one processor to implement a method for image segmentation. The method may include obtaining an initial image; and determining, based on the initial image, using a fusion model, at least one target image each of which including a portion of a target region, and an initial segmentation result of the portion of the target region for each of the at least one target image, the fusion model being obtained based on multi-task learning.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
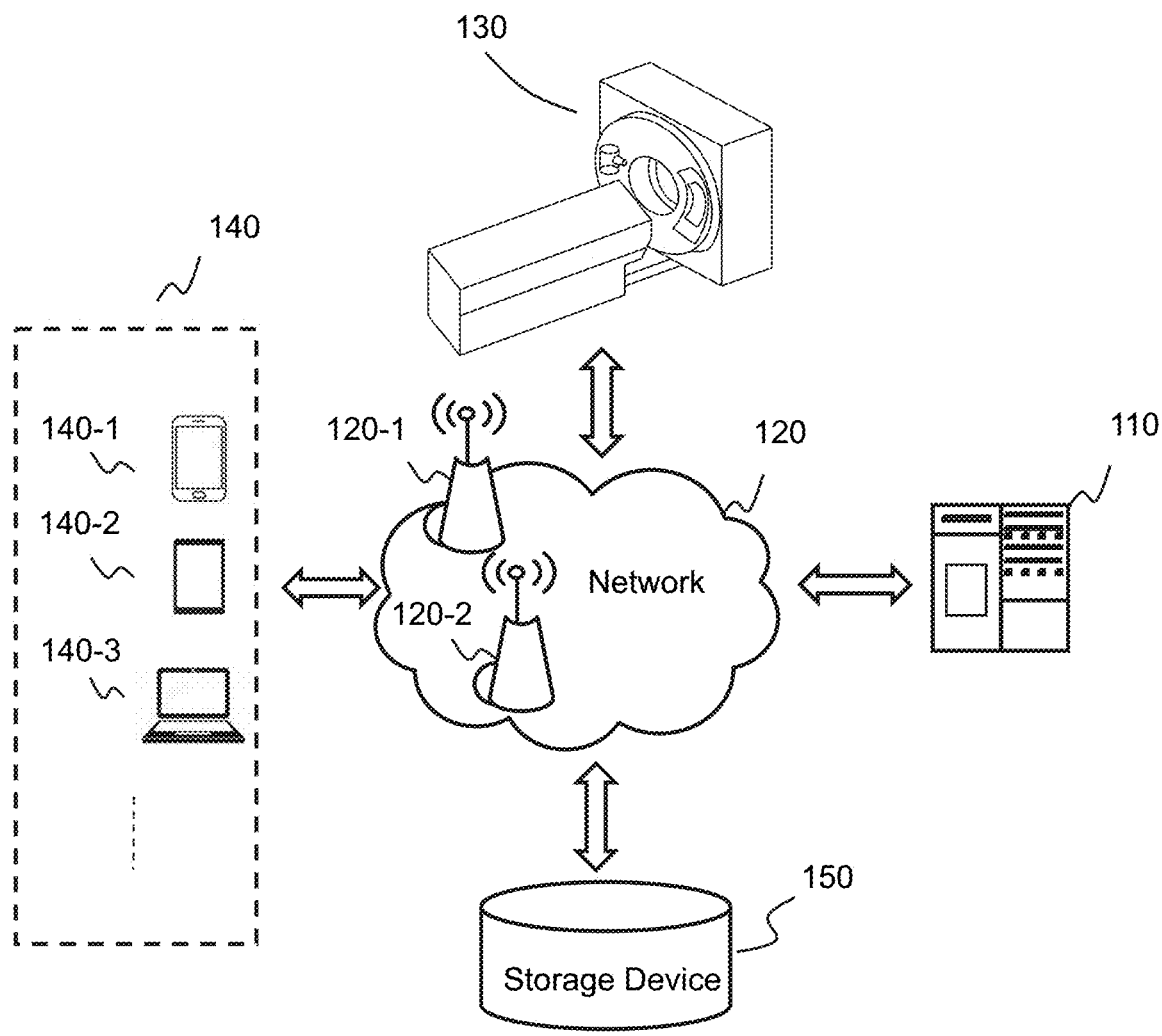
FIG. 1 is a schematic diagram illustrating an application scenario of an exemplary image segmentation system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

In the present disclosure, a target volume may include various types of target volumes for tumor radiotherapy. For example, the target volume may include a target volume of pulmonary tumor, a target volume of stomach tumor, a target volume of liver tumor, a target volume of esophageal tumor, a target volume of brain tumor, a target volume of breast tumor, a target volume of thyroid tumor, a target volume of pancreatic tumor, etc. The above examples of the target volume in the present disclosure are merely provided for illustration, and not intended to limit the scope of the present disclosure.

Conventional image segmentation techniques (e.g., an edge detection technique, a threshold segmentation technique, a diagram database-based segmentation technique, etc.) require segmented subjects with significant boundary features. However, images with blurred boundaries between segmented regions and background regions may include unclear boundary information. For example, a range of a target volume of cancer in a medical image may include cancer lesions and surrounding normal tissues that are mutually infringed. Therefore, a segmentation accuracy of the conventional image segmentation techniques is relatively poor.

Deep learning-based techniques for target volume segmentation usually use end-to-end models. Image features are extracted using convolutional neural networks, and corresponding segmentation results are generated. However, the end-to-end models require a large amount of high-quality data with labeling, otherwise deviations of training data may lead to less accurate results of the target volume. On the other hand, the adjustment of hyperparameter(s) of the end-to-end models is difficult, which requires experienced machine learning engineers to adjust the hyperparameter(s) based on training results. In addition, the segmentation of complex images needs more model parameters, which consumes more computing resources. Besides, an accuracy of the segmentation along a layer thickness direction is poor during the segmentation.

Although an effect of the deep learning-based techniques for target volume segmentation is superior to that of the conventional image segmentation techniques, generalization of the deep learning-based techniques may be low, the positioning result of the target volume may be inaccurate, predicted ranges of target regions may be too large or too small, which increases a subsequent resource consumption. For example, workloads of physicians who perform the target volume segmentation of the medical images may be increased.

Therefore, in some embodiments of the present disclosure, a method for image segmentation is provided. The method may realize automatic positioning and automatic determining (e.g., outlining) of the target volume using a positioning model and a segmentation model, which improves an accuracy of the segmentation and reduces the consuming time.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

FIG. 1 is a schematic diagram illustrating an application scenario of an exemplary image segmentation system according to some embodiments of the present disclosure.

In some embodiments, an image segmentation system may be applied to a face recognition platform. For example, the image segmentation system may segment a target face image from an intelligent monitoring image in real-time, determine identity information of a user based on a registered face image of the user, and further perform operations (e.g., face payment, face access control, etc.) based on the identity information of the user.

In some embodiments, the image segmentation system may be applied to an industrial model database platform. For example, the image segmentation system may segment a single building, device, and/or facility from a three-dimensional (3D) building model, and store the building, device, and/or facility in a model database, facilitating further use in a next industrial design.

In some embodiments, the image segmentation system may be applied to or coupled to or configured as a medical system. For instance, the image segmentation system may segment a target region (e.g., a target volume of tumor, a region of an organ at risk (OAR), etc.) included in an initial image (e.g., a two-dimensional (2D) image, a 3D image). For example, the image segmentation system may segment a tumor included in a 3D computed tomography (CT) (e.g., fan-beam computed tomography (FBCT) or cone-beam computed tomography (CBCT)) image from normal tissues, and highlight the segmented tumor, for example, by using a striking color to display a region of the tumor. As another example, the image segmentation system may display the region of the tumor and the OAR with different colors, respectively, after segmenting the tumor and the OAR included in the medical image from other tissues.

For illustration purposes, a medical system is described as an example in the disclosure. The medical system may include a radiotherapy (RT) system 100. As shown in FIG. 1, the RT system 100 may include a processing device 110, a network 120, an RT device 130, terminal(s) 140, and a storage device 150. Various components in the RT system 100 may be connected to each other via the network 120. For example, the processing device 110 and the RT device 130 may be connected or communicated via the network 120. Processing results of the image segmentation system may be applied to an RT planning system or the RT system 100. For example, a segmentation result of a target volume may be applied to the RT planning system for determining an RT plan. The RT plan may be further used in the RT system 100 for radiotherapy. In some embodiments, the image segmentation system may be independent of the RT system 100 or the RT planning system. In some embodiments, the image segmentation system may be a portion of the RT system 100 or the RT planning system. In some embodiments, an image processed by the image segmentation system may be generated by an imaging device. The image generated by the imaging device may be segmented by the image segmentation system to determine the target volume. Therefore, the medical system may include or be an imaging system. Accordingly, the RT system 100 may be replaced with the imaging system, and the RT device 130 may be replaced with the imaging device. The image segmentation system may be independent of the imaging system or a portion of the imaging system.

The processing device 110 may process data and/or information obtained from the RT device 130, the storage device 150, the terminal(s) 140, or other components of the RT system 100. In some embodiments, the processing device 110 may be configured to obtain the initial image (e.g., the 2D image and/or the 3D image). For example, the processing device 110 may obtain a 2D image of a target subject (e.g., a patient) from the storage device 150. As another example, the processing device 110 may obtain a plurality of tomographic images of the target subject (e.g., the patient) for constructing a 3D image of the target subject from an imaging component or device, wherein the plurality of tomographic images may be determined after the target subject is imaged by scanning. The imaging component or device may include an imaging component or device (related to the RT device 130) that is an imaging component or device integrated into the RT device 130. That is, the imaging component or device may be directly associated with the RT device 130. The imaging component or device related to the RT device 130 may be configured to obtain an image (e.g., the CT image) for determining a target subject (e.g., the patient) of an RT target volume. The imaging component or device may also include an imaging component or device independent of the RT device 130. The imaging component or device independent of the RT device 130 may be configured to obtain the initial image for determining the target region (e.g., the RT target volume) of the target subject (e.g., the patient).

In some embodiments, the processing device 110 may determine, based on the initial image, at least one target image using a positioning model. Each of the at least one target image may include a portion of the target region. For example, the processing device 110 may classify, using a trained positioning model, the plurality of tomographic images of the initial image (e.g., the 3D image). One or more tomographic images including the target volume may be determined as the target image. As another example, the processing device 110 may classify, using the trained positioning model, a plurality of 2D image blocks of the initial image (e.g., the 2D image). One or more 2D image blocks including a region of the OAR may be determined as the target image.

In some embodiments, for the each of the at least one target image, the processing device 110 may determine an initial segmentation result of the portion of the target region using a trained segmentation model. For example, the processing device 110 may determine whether each pixel in the target image is within a range of the target region using the trained segmentation model, and mark the each pixel using an identifier. In some embodiments, the processing device 110 may determine a target segmentation result of the target region based on the at least one initial segmentation result. For example, the initial segmentation result may be mapped to the 3D image to highlight the target volume. In some embodiments, the processing device 110 may be a single server or a server group. The server group may be centralized or distributed. In some embodiments, the processing device 110 may be local or remote. For example, the processing device 110 may access information and/or data stored in the RT device 130 (or the imaging component or device), the storage device 150, and/or the terminal(s) 140 via the network 120. As another example, the processing device 110 may be directly connected to the RT device 130 (or the imaging component or device), the terminal(s) 140, and/or the storage device 150 to access stored information and/or data. In some embodiments, the processing device 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 110 may be implemented by a computing device 200. In some embodiments, the processing device 110 may optimize the RT plan based on the segmentation result of the target region. The optimized RT plan may be performed by the RT device 130 after quality verification.

In some embodiments, the processing device 110 may include one or more sub-processing devices (e.g., a single-core processing device or a multi-core processing device). Merely by way of example, the processing device 110 may include a central processing unit (CPU), an application specific integrated circuit (ASIC), an application specific instruction processor (ASIP), a graphics processor (GPU), a physical processor (PPU), a digital signal processor (DSP), a field programmable gate array (FPGA), a programmable logic device (PLD), a controller, a microcontroller unit, a reduced instruction set computer (RISC), a microprocessor, or the like, or any combination thereof.

The network 120 may include any suitable network that can promote an exchange of information and/or data of the RT system 100 (or the imaging system). The data and/or information may include raw scanning data (or image raw data) or one or more medical images that the imaging component or device sends to the processing device 110. For example, the processing device 110 may obtain a sub-image of the target subject from the imaging component or device via the network 120. As another example, the processing device 110 may obtain an instruction of the user (e.g., a doctor) from the terminal(s) 140 via the network 120. In some embodiments, the network 120 may be any type of wired or wireless network, or a combination thereof. For example, the network 120 may include a cable network, a wired network, an optical fiber network, a telecommunication network, an Intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, an ultra wide band (UWB) network, a mobile communication (e.g., 1G, 2G, 3G, 4G, 5G, etc.) network, a narrow band internet of things (NB-IoT), an infrared communication network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the RT system 100 (or the imaging system) may be connected to the network 120 to exchange data and/or information.

The RT device 130 may include a normal RT device or an image-guided RT device. For example, the image-guided RT device may obtain a medical image of a subject (e.g., the patient) to be imaged using an imaging component integrated on the image-guided RT device. In some embodiments, the RT device 130 may include an X-ray machine, a cobalt 60 ray machine, a medical accelerator, a γ knife, a cyber knife, a Tomo knife, or the like, or any combination thereof. In some embodiments, the RT device 130 may be configured to perform the RT plan. The RT plan may be optimized based at least on a segmentation result of the RT target volume of an RT subject (e.g., the patient). The segmentation result of the RT target volume may be determined (e.g., determined by the image segmentation system) based on scanning data (e.g., the scanning data, a reconstruction image based on the scanning data, etc.) of the RT subject obtained by the imaging component of device related to the RT device or independent of the RT device. In some embodiments, the imaging component of device related to the RT device or independent of the RT device may include an X-ray imaging device (e.g., a computed X-ray radiography (CR), a digitized X-ray radiography (DR), a computed tomography (CT) scanner, a mobile X-ray device (e.g., a mobile C-arm scanner), a digital subtraction angiography (DSA) scanner, an emission computed tomography (ECT) scanner, etc.), a magnetic resonance imaging (MRI) device, an ultrasound imaging device, a nuclear medical imaging device (e.g., a positron emission tomography (PET) device, a single-photon emission computed tomography (SPECT) device, a gamma camera, etc.), or the like, or any combination thereof. The imaging component or device may obtain the 2D image and/or the 3D image of the target subject. For example, the imaging component or device may obtain a 2D tomography image of the target subject, and may also obtain a 3D stereoscopic image determined based on the plurality of 2D tomography images. In some embodiments, the imaging component or device may obtain the scanning data by scanning the subject to be imaged, and obtain the reconstruction image of the target subject by performing an image reconstruction based on the scanning data. In some embodiments, the imaging component or device may include a device including a data sending function. For example, when or after the subject to be imaged is scanned, the obtained scanning data or the reconstruction image generated based on the scanning data may be sent to the processing device 110. In some embodiments, the imaging component or device may send the data to the processing device 110 via network 120. In some embodiments, the imaging component or device may send the data directly to the processing device 110.

The terminal(s) 140 may be communicated with and/or connected to the RT devices 130 (or the imaging component or device), the processing device 110, and/or storage device 150. For example, the terminal(s) 140 may obtain the target segmentation result of the 3D image from the processing device 110. As another example, the terminal(s) 140 may obtain the scanning data or an output image obtained by the imaging component or device, and send the scanning data or the output image to the processing device 110 for processing. In some embodiments, the terminal(s) 140 may include a mobile device 140-1, a tablet computer 140-2, a laptop computer 140-3, a desktop computer, or the like, or any combination thereof. For example, the mobile device 141 may include a mobile phone, a personal digital assistant (PDA), a gaming device, a navigation device, or the like, or any combination thereof. In some embodiments, the terminal(s) 140 may include an input device, an output device, etc. The input device may include alphanumeric and other keys that may be input via a keyboard, a touchscreen (e.g., with haptics or tactile feedback), a speech input, an eye tracking input, a brain monitoring system, or any other comparable input mechanism. Input information received by the input device may be transmitted, e.g., by a bus, to the processing device 110 for further processing. Other types of the input device may include a cursor control device, such as a mouse, a trackball, cursor direction keys, etc. The output device may include a display, a printer, or the like, or any combination thereof. In some embodiments, the terminal(s) 140 may be a portion of the processing device 110. The terminal(s) 140 and the processing device 110 may be integrated as a control device (e.g., an operation table) for the RT device 130 (or the imaging component or device). In some embodiments, the terminal(s) 140 may be omitted.

The storage device 150 may store data, instructions, and/or any other information. In some embodiments, the storage device 150 may store information that the user controls a performance of the imaging device. For instance, the information that the user controls the performance of the imaging device may include a record that the user manually adjusts parameters of the imaging device, a user recognition of the output image of the imaging device, a part of the imaging device that is used to image by the user, a positioning region of a region of interest in the output image of the imaging device, or the like, or any combination thereof. In some embodiments, the storage device 150 may store the data obtained from the RT device 130 (or the imaging component or device), the terminal(s) 140, and/or the processing device 110. In some embodiments, the storage device 150 may store data and/or instructions that the processing device 110 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components in the RT system 100 (or the imaging system). At least one component in the RT system 100 may access the data or instructions stored in the storage device 150 via the network 120. In some embodiments, the storage device 150 may be a portion of the processing device 110.

In some embodiments, the RT system 100 (or the imaging system) may also include one or more power supplies (not shown in FIG. 1) connected to one or more components (e.g., the processing device 110, the RT device 130 (or the imaging component or device), the terminal(s) 140, the storage device 150, etc.) of the RT system 100 (or the imaging system).

It should be noted that the description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. In some embodiments, the storage device 150 may be data storage including cloud computing platforms, such as a public cloud, a private cloud, community, and hybrid clouds, or the like. However, those variations and modifications do not depart the scope of the present disclosure.

Figure 2:
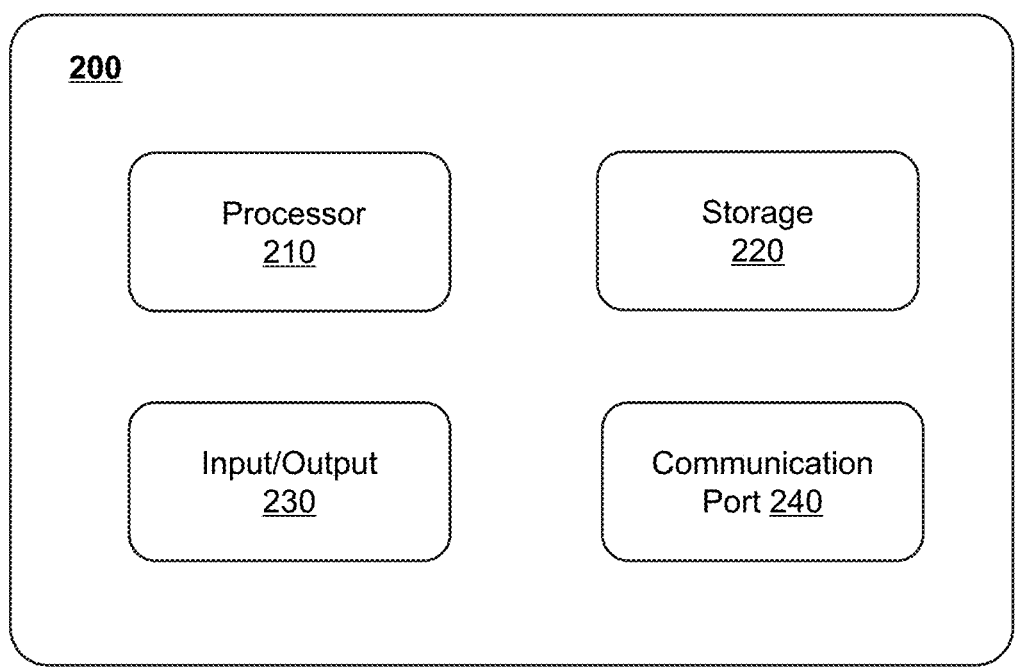
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device 200 according to some embodiments of the present disclosure. As illustrated in FIG. 2, the computing device 200 may include a processor 210, a storage 220, an input/output (I/O) 230, and a communication port 240. The processor 210 may execute computer instructions (e.g., program code) and perform functions of the processing device 110 in accordance with techniques described herein. The computer instructions may include, for example, routines, programs, objects, components, data structures, procedures, modules, and functions, which perform particular functions described herein. For example, the processor 210 may process imaging data obtained from the RT device 130 (or the imaging component or device), the terminal(s) 140, the storage device 150, the image segmentation system, and/or any other component of the RT system 100 (or the imaging system). In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the RT device 130 (or the imaging component or device), the terminal(s) 140, the storage device 150, and/or any other component of the RT system 100. In some embodiments, the storage 220 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store at least one program and/or instruction that is used to execute or perform exemplary methods described in the present disclosure.

The I/O 230 may input and/or output signals, data, information, etc. In some embodiments, the I/O 230 may enable a user interaction with the processing device 110. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 120) to facilitate data communications. The communication port 240 may establish connections between the processing device 110 and the RT device 130 (or the imaging component or device), the terminal(s) 140, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
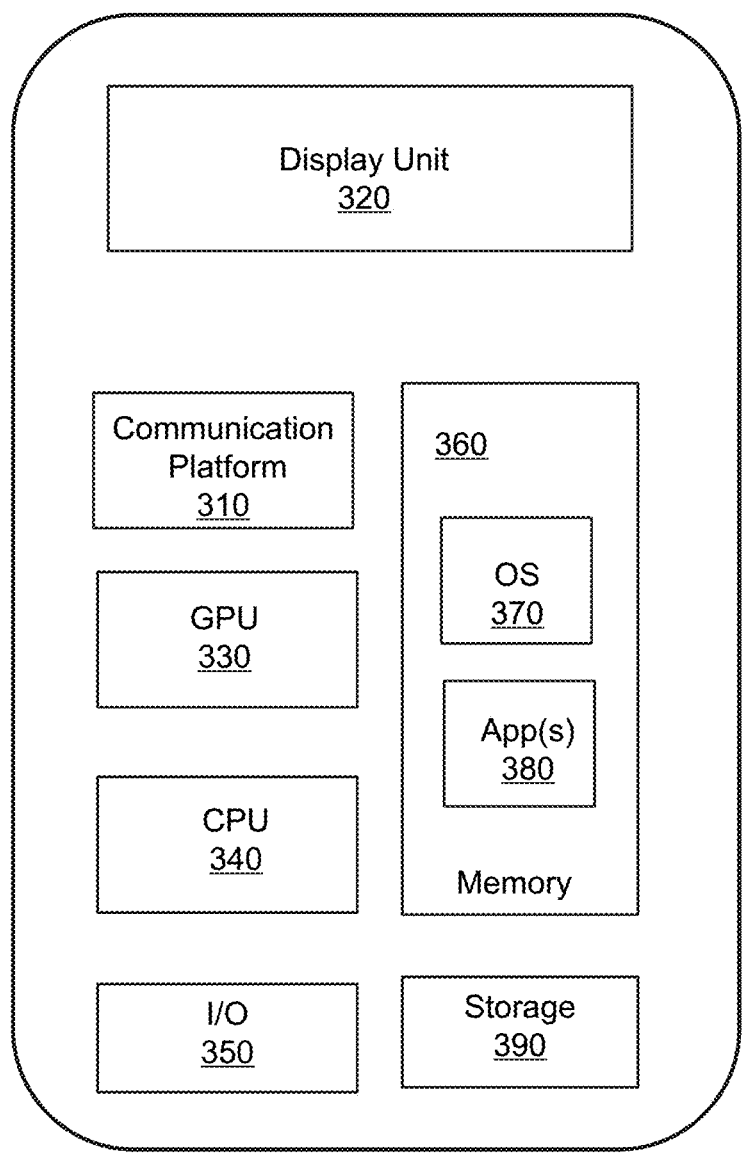
FIG. 3 is a schematic diagram illustrating exemplary hardware and/or software components of an exemplary mobile device on which a terminal device may be implemented according to some embodiments of the present disclosure.

FIG. 3 is a schematic diagram illustrating exemplary hardware and/or software components of an exemplary mobile device 300 according to some embodiments of the present disclosure.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the RT system 100, and enable data and/or signal to be transmitted between the mobile device 300 and other components of the RT system 100. For example, the communication platform 310 may establish a wireless connection between the mobile device 300 and the RT device 130, and/or the processing device 110. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the RT system 100. For example, the communication platform 310 may transmit data and/or signals inputted by a user to other components of the RT system 100. The inputted data and/or signals may include a user instruction. As another example, the communication platform 310 may receive data and/or signals transmitted from the processing device 110. The received data and/or signals may include imaging data acquired by the RT device 130 (or the imaging component or device).

In some embodiments, a mobile operating system (OS) 370 (e.g., iOS™ Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information respect to an imaging process or other information from the processing device 110. User interactions with the information stream may be achieved via the I/O 350 and provided to the processing device 110 and/or other components of the RT system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
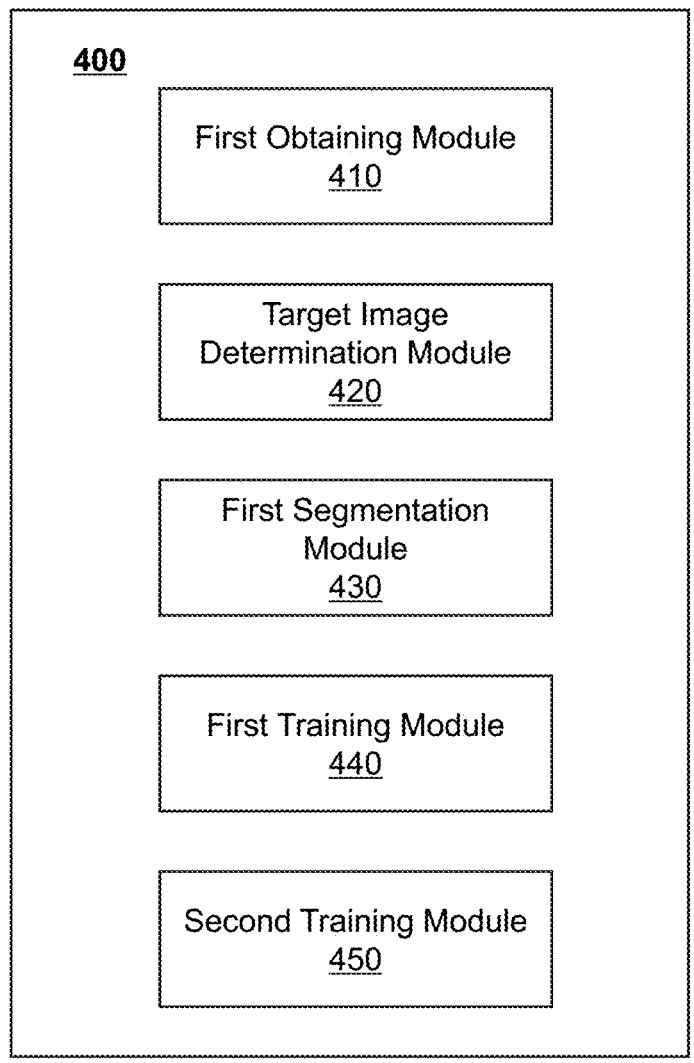
FIG. 4 is a block diagram illustrating an exemplary image segmentation system according to some embodiments of the present disclosure.

FIG. 4 is a schematic diagram illustrating an exemplary image segmentation system 400 according to some embodiments of the present disclosure. In some embodiments, the image segmentation system 400 may be configured to segment an initial image (e.g., a 3D image). As shown in FIG. 4, the image segmentation system 400 may include a first obtaining module 410, a target image determination module 420, a first segmentation module 430, a first training module 440, and/or a second training module 450. In some embodiments, the image segmentation system 400 may include the first obtaining module 410, the target image determination module 420, and the first segmentation module 430.

The first obtaining module 410 may be configured to obtain an initial image. In some embodiments, the initial image may include a 2D image (e.g., a 2D medical image). In some embodiments, the initial image may include a 3D image (e.g., a 3D medical image). In some embodiments, the 3D image may include a plurality of tomographic images for constructing the 3D image. The 3D image may include a 3D image obtained when a target subject is imaged. For example, the target subject may include a patient, or a specific body tissue or organ of tumor thereof. The plurality of tomographic images for constructing the 3D image may include a CT image, an MR image, a PET image, a CR image, a DR image, a DSA image, an ECT image, a SPECT image, a gamma camera image, or the like, or any combination thereof. More descriptions of the first obtaining module 410 may be found elsewhere in the present disclosure (e.g., operation 510 and descriptions thereof), which may not be repeated herein.

The target image determination module 420 may be configured to determine, based on the initial image, at least one target image using a positioning model. The target image may include a portion of a target region. When the initial image includes a 2D image, the at least one target image may include a 2D image block (or a sub-image) of the 2D image. When the initial image includes a 3D image, the at least one target image may include a 3D image block (or a sub-image) of the 3D image or a plurality of tomographic images for constructing the 3D image. The target image determination module 420 may determine the at least one target image from a plurality of sub-images of the initial image. In some embodiments, the target image determination module 420 may determine at least one feature parameter based on at least one feature of the target region, and obtain, based on the at least one feature parameter, the plurality of sub-images from the initial image. In some embodiments, the target image determination module 420 may obtaining a plurality of preprocessed sub-images by preprocessing the plurality of sub-images, respectively. In some embodiments, the preprocessing may include an image normalization operation, an image resampling operation, or the like, or any combination thereof.

The target image determination module 420 may determine the at least one target image from the plurality of preprocessed sub-images using the positioning model. The positioning model may include a machine learning-based classification model, such as a decision tree, an artificial neural network model, a multi-layer perception machine, a KNN, a support vector machine (SVM), a simple Bayes model, an Adaboost model, a logic regression model, a random forest, a gradient boost tree, a gradient boosted decision tree (GBDT), etc. Exemplary artificial neural network models may include a neural network-based deep learning model, such as CNN, DNN, an ImageNet, a visual geometry group network (VGG-Net), a deep residual network (ResNet), a dense convolutional network (Densenet), a rethinking model scaling for convolutional neural network (EfficientNet), etc. The target image determination module 420 may obtain a corresponding determination result by inputting the sub-image to the trained positioning model. The determination result may indicate whether the sub-image(s) input to the positioning model include the portion of the target region. When the sub-image includes the portion of the target region, the sub-image may be designated as the target image. More descriptions of the target image determination module 420 may be found elsewhere in the present disclosure (e.g., operation 520 and descriptions thereof), which may not be repeated herein.

The first segmentation module 430 may be configured to determine an initial segmentation result of the portion of the target region using a segmentation model for the each of the at least one target image. The segmentation model may include a conventional segmentation algorithm model (e.g., a threshold algorithm, a regional growth algorithm, etc.), and/or another segmentation algorithm model (e.g., a genetic algorithm, an active contour model, etc.). The segmentation model may include a neural network-based deep learning model. Exemplary segmentation models may include a deep learning model based on a convolutional neural network (CNN), a deep neural network (DNN), a recurrent neural network (RNN) (including a recurrent convolutional neural network (RCNN), a fast RCNN, a faster RCNN, a "you only look once" (YOLO) model, a single shot multibox detector (SSD), etc.), a fully convolutional network (FCN), a SegNet model, a U-Net model, a V-Net model, a dilated convolution model, a refine network (RefineNet), a pyramid scene parsing network (PSPNet), or other similar neural networks. The first segmentation module 430 may determine the initial segmentation result (also referred to a first segmentation result) of the portion of the target region by inputting the target image to the segmentation model. The first segmentation result may indicate a location or a region of the portion of the target region in the target image. In some embodiments, the segmentation model may include a 3D segmentation model. In some embodiments, the segmentation model may include a 2D segmentation model. The 2D segmentation model may be built based on a 2D convolution network. Compared to the target volume segmented directly in three-dimension, 2D segmentation may improve the segmentation accuracy and speed of the target volume, and reduce the calculation load.

The first segmentation module 430 may be configured to determine a target segmentation result (or referred to as the first target segmentation result) of the target region based on the at least one initial segmentation result. In some embodiments, the first segmentation module 430 may obtain the first target segmentation result of the 2D image (or the 2D image) based on the first segmentation result of the plurality of 2D image blocks (or 3D image blocks). For example, the first segmentation module 430 may obtain the first target segmentation result of the initial image by determining a union set of a plurality of first segmentation results of the plurality of 2D image blocks (or 3D image blocks). In some embodiments, the first segmentation module 430 may obtain the 3D image based on the plurality of tomographic images. For example, the first segmentation module 430 may reconstruct a 3D image based on a plurality of tomographic images using a surface rendering or a volume rendering. After obtaining the 3D image, the first segmentation module 430 may determine the target segmentation result of the 3D image by mapping the at least one first segmentation result to the 3D image. Merely by way of example, the first segmentation module 430 may determine which pixels in each target image belong to the target region based on the first segmentation result, and further determine voxels corresponding to the pixels in the 3D image. More descriptions of the first segmentation module 430 may be found elsewhere in the present disclosure (e.g., operation 530 and descriptions thereof), which may not be repeated herein.

The first training module 440 may be configured to train the positioning model. In some embodiments, the first training module 440 may obtain a plurality of first training samples, and perform an iterative operation including one or more iterations based on the plurality of first training samples to obtain a trained positioning model. In some embodiments, each of the plurality of first training samples may include a first sample sub-image and a first sample label. In an iteration, the first training module 440 may sequentially input a plurality of first sample sub-images to the positioning model, and obtain a determination result of whether each of the first sample sub-images includes a portion of a sample region. First model parameters of the positioning model may be updated based on a first difference between the determination result and the first sample label. More descriptions of the first training module 440 may be found elsewhere in the present disclosure (e.g., FIG. 9 and descriptions thereof), which may not be repeated herein.

The second training module 450 may be configured to train the segmentation model. In some embodiments, the second training module 450 may obtain a plurality of second training samples, and perform an iterative operation including one or more iterations based on the plurality of second training samples to obtain a trained segmentation model. In some embodiments, each of the second training samples may include a second sample sub-image and a second sample label. The second sample sub-image may include a portion of the sample region. In an iteration, the second training module 450 may sequentially input a plurality of second sample sub-images to the segmentation model, and obtain a predicted segmentation result for the portion of the sample region included in the second sample sub-image. Second model parameters of the segmentation model may be updated based on a second difference between the predicted segmentation result and the second sample label. More descriptions of the second training module 450 may be found elsewhere in the present disclosure (e.g., FIG. 10 and descriptions thereof), which may not be repeated herein.

In some embodiments, the image segmentation system 400 may also include a sample obtaining module. The sample obtaining module may be configured to obtain training samples. In some embodiments, the sample obtaining module may obtain a plurality of sample sub-images. In some embodiments, the plurality of sample sub-images may include one or more first sub-images and/or one or more second sub-images. In some embodiments, each of the one or more first sub-images may include no sample region. In some embodiments, each of the one or more second sub-images may include a portion of the sample region and a segmentation result of the portion of the sample region. In some embodiments, feature extraction may be performed on an image data distribution and/or a sample region distribution of the plurality of sample sub-images, respectively, to obtain at least one data feature of each of the sample sub-images. In some embodiments, the sample obtaining module may determine at least one first sub-image for training from the one or more first sub-images based on the data features, determine at least one second sub-image for training from the one or more second sub-images based on the features. In some embodiments, the sample obtaining module may determine the first training samples and the second training samples based on the one or more first sub-images and the one or more second sub-images. For instance, in some embodiments, the sample obtaining module may determine the first training samples based on at least one first sub-image for training and/or at least one second sub-image for training. In some embodiments, the sample obtaining module may determine the second training samples based on at least one second sub-image for training.

In some embodiments, the sample obtaining module may perform a pre-processing operation on the plurality of sample sub-images, respectively, and determine the first training samples and the second training samples from a plurality of preprocessed sample sub-images, respectively. In some embodiments, the sample obtaining module may perform a pre-processing operation on the at least one first sub-image for training and the at least one second sub-image for training, respectively, and obtain at least one preprocessed first sub-image for training and/or at least one preprocessed second sub-image for training. In some embodiments, the sample obtaining module may designate the at least one preprocessed first sub-image for training and/or the at least one preprocessed second sub-image for training as the first training samples. In some embodiments, the sample obtaining module may designate the at least one preprocessed the second sub-image for training as the second training samples. The preprocessing may include at least one of image normalization, image resampling, etc. In some embodiments, the preprocessing may include at least an image normalization operation.

It should be noted that the image segmentation system 400 and its modules illustrated in FIG. 4 may be implemented via various ways. For example, in some embodiments, the image segmentation system 400 and its modules may be implemented through hardware, software, or a combination thereof. Herein, the hardware may be implemented by a dedicated logic; the software may be stored in the storage, the image segmentation system 400 may be executed by proper instructions, for example, by a microprocessor or a dedicated design hardware. Those skilled in the art can understand that, the methods and systems described in the present disclosure may be implemented by the executable instructions of a computer and/or by control code in the processor, for example, the code supplied in a carrier medium such as a disk, a CD, a DVD-ROM, in a programmable storage such as a read-only memory (firmware), or in a data carrier such as optical signal carrier or electric signal carrier. The image segmentation system 400 and its modules in the present disclosure may be implemented by a hardware circuit in a programmable hardware device in an ultra large scale integrated circuit, a gate array chip, a semiconductor such as a transistor, a field programmable gate array, a programmable logic device, a software performed by various processors, or a combination thereof (e.g., firmware).

It should be noted that the above descriptions of the image segmentation system 400 and its modules are merely provided for illustration, and not intended to limit the scope of the present disclosure. Apparently, for those skilled in the art, after understanding the principle of the image segmentation system 400, it is possible to arbitrarily combine various modules, or form a subsystem to connect with other modules without departing from this principle. For example, the first obtaining module 410 and the target image determination module 420 disclosed in FIG. 4 may be different modules in a system, or one module that can realize the functions of the two modules. As another example, modules in the image segmentation system 400 may be included in different processing devices. For instance, a processing device 110A and a processing device 1106 may be integrated into one processing device 110. The processing device 110A may include the first obtaining module 410, the target image determination module 420, and the first segmentation module 430, and the processing device 1106 may include the first training module 440 and the second training module 450. As still another example, modules in the image segmentation system 400 may share a storage module. Alternatively, each module may also include its own storage module. Such deformations do not depart from the scope of the present disclosure.

Figure 5A:
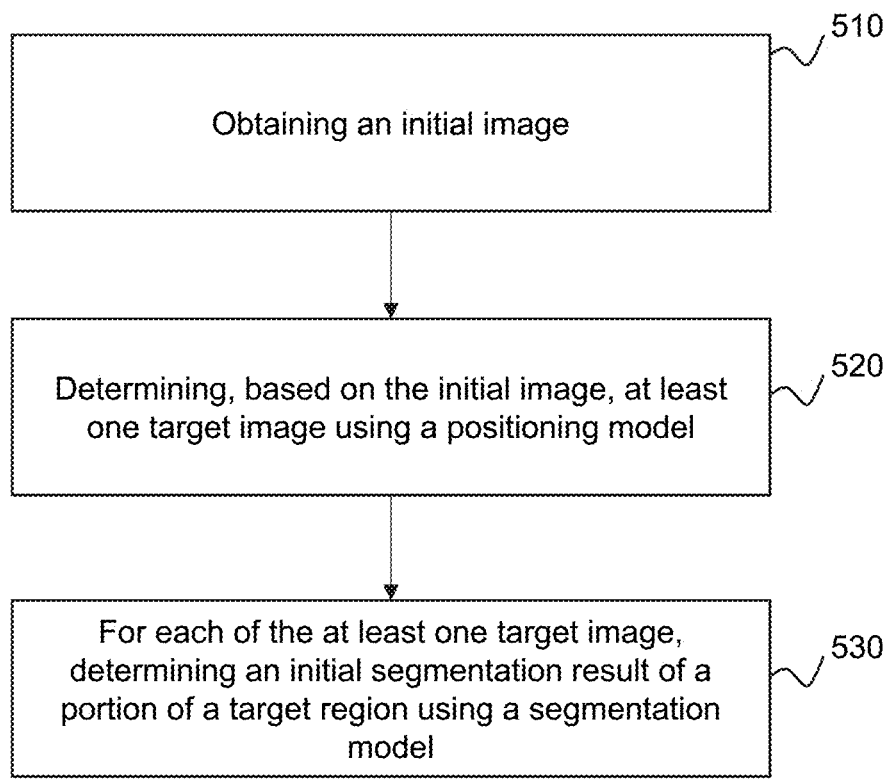
FIG. 5A is a flowchart illustrating an exemplary process for image segmentation according to some embodiments of the present disclosure.

FIG. 5A is a flowchart illustrating an exemplary process for image segmentation according to some embodiments of the present disclosure. In some embodiments, the process 500 may be implemented in the processing device 110 illustrated in FIG. 1. For example, the process 500 may be stored in the storage device 150 and/or the storage (e.g., the storage 220, the storage 390) as a form of instructions, and invoked and/or executed by the processing device 110 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing device 110 (e.g., the first obtaining module 410) may obtain an initial image.

In some embodiments, the initial image may include an image to be segmented, such as a medical image to be segmented. The medical image may refer to an image of an internal tissue of a target subject obtained in a non-invasive manner for medical or medical research purposes. In some embodiments, the target subject may include a human body, an organ, a body, an object, a lesion, a tumor, etc. For example, the target subject may include one or more diseased tissues in the brain of a patient.

In some embodiments, the initial image may include an X-ray image, a CT image, a PET image, a SPECT image, an MR image, an ultrasound scanning (US) image, a DSA image, a magnetic resonance angiography (MRA) image, a time of flight-magnetic resonance image (TOF-MRI), a magnetoencephalography (MEG), or the like, or any combination thereof.

In some embodiments, a format of the initial image may include an image format of joint photographic experts group (JPEG), an image format of tagged image file format (TIFF), an image format of graphics interchange format (GIF), an image format of kodiak flash pix (FPX), an image format of digital imaging and communications in medicine (DICOM), etc.

In some embodiments, the initial image may include a 2D image (e.g., a 2D medical image). For example, the target subject may be a patient, or a specific body tissue or organ that has a tumor. If a lung tumor is growing in the patient, raw scanning data for reconstructing a 2D medical image of a chest of the patient may be obtained by scanning the chest of the patient using an imaging component or device (e.g., CT). The raw scanning data may be used for reconstruction to obtain the 2D medical image of the chest of the patient.

In some embodiments, the initial image may include a 3D image (e.g., a 3D medical image). In some embodiments, the 3D image may include a plurality of tomographic images or 3D volume data for reconstructing the 3D image. Exemplary tomographic images may include a CT image, a PET image, an MR image, or the like, or any combination thereof. The tomographic image may be a 2D image that is reconstructed based on the raw scanning data acquired by the imaging component or device (e.g., CT). The 3D image of the chest of the patient may be obtained by reconstruction based on the plurality of tomographic images or the 3D volume data acquired by the imaging component or device (e.g., CT). For example, the 3D image may be reconstructed using a surface rendering-based reconstruction algorithm or a volume rendering-based reconstruction algorithm.

In some embodiments, the first obtaining module 410 may obtain the initial image from the imaging component or device. For example, after an imaging component or device (e.g., a CT scanner, a PET scanner, an MR scanner, etc.) scans the target subject, the initial image may be obtained through image reconstruction. The first obtaining module 410 may obtain the initial image by communicating with the imaging component or device via the network 120.

In some embodiments, the first obtaining module 410 may obtain the initial image from the storage device 150. For example, after obtaining the initial image, the imaging component or device may transmit the initial image to the storage device 150 for storing. The first obtaining module 410 may obtain the initial image by communicating with the storage device 150 via the network 120.

In 520, the processing device 110 (e.g., the target image determination module 420) may determine, based on the initial image, at least one target image using a positioning model.

Figure 5B:
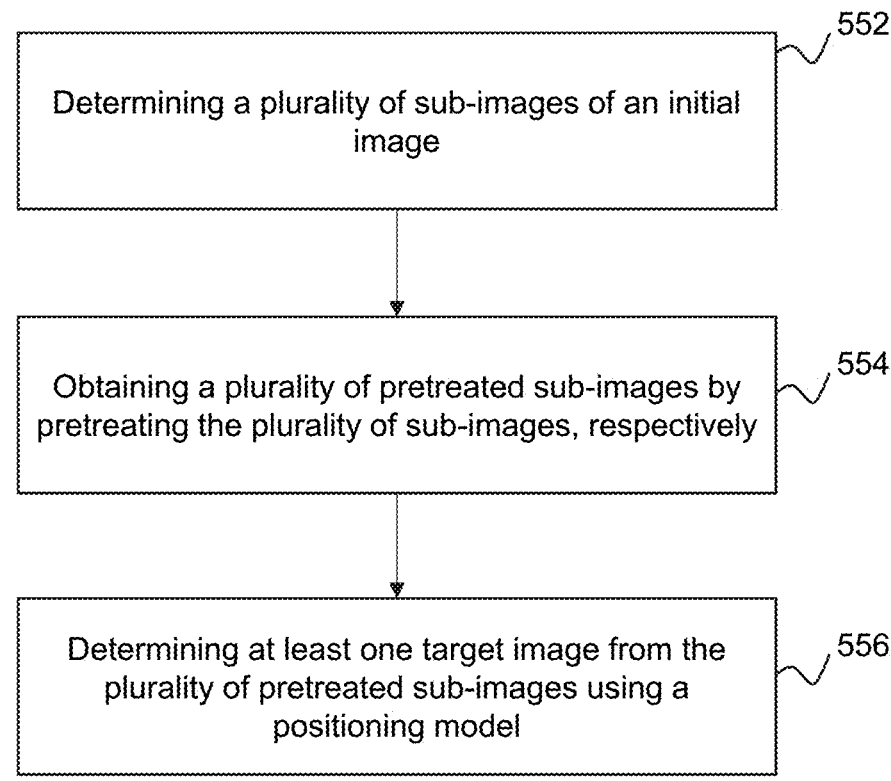
FIG. 5B is a flowchart illustrating an exemplary process for determining at least one target image according to some embodiments of the present disclosure.

More descriptions of the determination of the at least one target image may be found elsewhere in the present disclosure, for example, FIG. 5B and relevant descriptions thereof, which may not be repeated herein.

In 530, for each of the at least one target image, the processing device 110 (e.g., the first segmentation module 430) may determine an initial segmentation result of a portion of a target region using a segmentation model.

The initial segmentation result (also referred to as a first segmentation result) of the portion of the target region may indicate a location or a region of the portion of the target region in the target image. For example, the first segmentation result may be a matrix. A size of the matrix may be consistent with a size of the target image, and each element in the matrix may correspond to one pixel in the target image. A value of the each element may be 1 or 0. The value "1" may indicate that the pixel in the target image corresponding to the element belongs to the portion of the target region, and the value "0" may indicate that the pixel in the target image corresponding to the element does not belong to the portion of the target region.

In some embodiments, the segmentation model may include a conventional segmentation algorithm model. Exemplary conventional segmentation algorithms may include a threshold algorithm, a region growing algorithm, a watershed algorithm, an edge detection algorithm, or the like, or any combination thereof. In some embodiments, the segmentation model may include a segmentation algorithm model in combination with a specific tool. Exemplary segmentation algorithm models in combination with the specific tool may include a genetic algorithm model, a wavelet analysis algorithm model, a wavelet transform algorithm model, an active contour model, or the like, or any combination thereof.

In some embodiments of the present disclosure, after one or more sub-images including the target region are determined, the first segmentation result may be determined based on the conventional segmentation algorithm model and/or the segmentation algorithm model in combination with the specific tool, which can improve the segmentation efficiency and accuracy of the target region (e.g., a phantom, an OAR with a clear edge, etc.) with a regular shape and/or a clear edge.

In some embodiments, the segmentation model may include a neural network-based deep learning model.

Exemplary segmentation models may include a deep learning model based on a convolutional neural network (CNN), a deep neural network (DNN), a recurrent neural network (RNN) (including a recurrent convolutional neural network (RCNN), a fast RCNN, a faster RCNN, a "you only look once" (YOLO) model, a single shot multibox detector (SSD), etc.), a fully convolutional network (FCN), a SegNet model, a U-Net model, a V-Net model, a dilated convolution model, a refine network (RefineNet), a pyramid scene parsing network (PSPNet), or other similar neural networks. The first segmentation module 430 may determine the segmentation result of the portion of the target region by inputting the target image to a trained segmentation model.

In some embodiments of the present disclosure, after one or more sub-images including the target region (or a portion thereof) are determined, the first segmentation result may be determined based on the neural network-based deep learning model, which can improve the segmentation efficiency and accuracy of the target region (e.g., a target volume of the tumor, a complex OAR with a blurry edge, etc.) with a complex shape and/or a blurry edge.

In some embodiments, the segmentation model may include a 2D segmentation model and/or a 3D segmentation model.

In some embodiments, the 2D segmentation model may be configured to determine the first segmentation result of the target image (e.g., a 2D image block and/or a tomographic image).

For example, taking a 2D threshold algorithm model as an example, the 2D threshold algorithm model may be configured to determine a grayscale threshold based on grayscale values of pixels in the 2D image block, and determine the first segmentation result of each pixel in the 2D image block by comparing the grayscale value of the each pixel in the 2D image block and the grayscale threshold.

As another example, taking a 2D convolutional segmentation model as an example, the 2D convolutional segmentation model may include an input layer, an activation layer, a pooling layer, a lower sampling layer, an upper sampling layer, a fusion layer, and/or an output layer. After input to the 2D convolutional segmentation model, the tomographic image may be convoluted, lower sampled, upper sampled, copied and merged (or fused), and a binary classification may be performed using a sigmoid function (e.g., determining whether each pixel in the tomographic image belongs to a portion of the target region), and then the 2D convolutional segmentation model may output the first segmentation result.

In some embodiments, the 3D segmentation model may determine the first segmentation result of the target image (e.g., a 3D image block).

For example, taking a 3D active contour model as an example, the 3D active contour model may be used to construct an energy function related to segmentation based on grayscale information of pixels in the 3D image block, and then determine a segmentation line by obtaining a minimum value of the energy function, to obtain the first segmentation result of the 3D image block. As used herein, pixels in 2-dimensional images and voxels in 3-dimensional images are both referred to as "pixels."

As another example, taking a 3D DNN segmentation model as an example, the 3D DNN segmentation model may include an input layer, a feature extraction layer, a fusion layer, and/or an output layer. The input layer may convert the 3D image block to a point cloud, the feature extraction layer may extract a feature of each point in the point cloud, and then the fusion layer may fuse information of the each point, and the output layer may finally output the first segmentation result based on the information of the each point. As used herein, the point cloud may indicate a set of massive points of a spatial distribution of the 3D image block and a surface feature of the 3D image block under a same spatial reference system.

In some embodiments, the segmentation model may be obtained by training using a plurality of sample sub-images each of which including a portion of a sample region. Each sample sub-image may include a sample label that can be used to indicate a location or region including the portion of the sample region in the sample sub-image. For example, the sample label may include a matrix a size of which is consistent with a size of the sample sub-image. Each element in the matrix may correspond to one pixel in the sample sub-image, respectively. A value of the each element may be 1 or 0. The value "1" of the element may indicate that the pixel in the sample sub-image corresponding to the element belongs to the portion of the sample region, and the value "0" of the element may indicate that the pixel in the sub-image corresponding to the element does not belong to the portion of the the of the element region. During the training, the sample sub-image may be input to the segmentation model. Parameters of the segmentation model may be updated during the training based on a difference between a segmentation result (obtained by the segmentation model) of the sample region (or the portion of the sample region) included in the sample sub-image and the sample label of the sample sub-image. When a preset training condition (e.g., a count (or number) of training times reaches a preset training time or the difference is less than a preset threshold) is satisfied, the training may be terminated and the trained segmentation model may be obtained. More descriptions of the training of the segmentation model may be found elsewhere in the present disclosure, for example, FIG. 10 and relevant descriptions thereof, which may not be repeated herein.

In some embodiments, the segmentation model may include a plurality of segmentation sub-models.

In some embodiments, the first segmentation module 430 may determine a target segmentation sub-model corresponding to a type of the target region from the plurality of segmentation sub-models based on the type of the target region.

As mentioned above, the type of the target region may include a type of a region of interest (ROI) (e.g., a target, a regular OAR, a complex OAR, and a phantom) and/or a type of a tissue which the target region belongs to (e.g., a lung, a heart, a brain, etc.). More descriptions of the type of the target region may be found elsewhere in the present disclosure, for example, operation 552 and relevant descriptions thereof, which may not be repeated herein.

It may be understood that different types of target regions may have different segmentation difficulties and/or segmentation accuracy requirements. In some embodiments, the segmentation efficiency and accuracy of the target region (e.g., the phantom, the OAR with a clear edge, etc.) with a regular shape and/or clear edge using a conventional segmentation algorithm model and/or a segmentation algorithm model in combination with a specific tool may be relatively high. The segmentation efficiency and accuracy of the target region (e.g., the target volume of the tumor, the complex OAR with blurry edge, etc.) with a complex shape and/or blurry edge using a neural network-based deep learning model may be relatively high. Therefore, the plurality of segmentation sub-models may include different model types and/or model parameters for different target regions.

In some embodiments, the first segmentation module 430 may determine the target segmentation sub-model based on a corresponding relationship between a preset type of the target region and the segmentation sub-model. For example, the relationship between the preset type of the target region and the segmentation sub-model may include that if the type of the target region includes "lung" and "target volume," the corresponding segmentation sub-model may be M1; if the type of the target region includes "lung" and "complex OAR," the corresponding segmentation sub-model may be M2; if the type of the target region includes "lung" and "simple OAR," the corresponding segmentation sub-model may be M3; and if the type of the target region includes "phantom," the corresponding segmentation sub-model may be M4.

For example, the segmentation model may include a DNN segmentation model M1 for segmenting the target volume, a CNN segmentation model M2 for segmenting the OAR with a complex segmentation shape and the blurry edge, and the active contour model M3 for segmenting the phantom. The first segmentation module 430 may determine the corresponding segmentation sub-models M1 and M2 corresponding to target regions "lung tumor" and "bronchial tree," respectively, based on that a type of the target region "lung tumor" included in the initial image includes "lung" and "target volume," and a type of the target region "bronchial tree" included in the initial image includes "lung" and "OAR."

In some embodiments, the first segmentation module 430 may determine the target segmentation sub-model based on the type of the target region and other features of the target region using a selection model. More descriptions of the feature of the target region may be found elsewhere in the present disclosure, for example, operation 552 and relevant descriptions thereof, which may not be repeated herein.

For example, the selection model may determine the target segmentation sub-model corresponding to the target region to be M1 based on that the type of the target region is "lung tumor," the size of the target region is that "a projection area is 10 square centimeters," an age of the target subject is "60," a gender of the target subject is "male," and a smoking history is "5 years."

The selection model may include a deep learning model. In some embodiments, the selection model may include a support vector machine model, a logistic regression model, a simple Bayes classification model, a Gaussian distribution-Bayesian classification model, a decision tree model, a random forest model, a k-nearest neighbor (KNN) classification model, a neural network Model, or the like, or any combination thereof.

Further, in some embodiments, the first segmentation module 430 may determine the first segmentation result of the portion of the target region using the target segmentation sub-model.

In some embodiments, the first segmentation module 430 may input the target image corresponding to the target region to the target segmentation sub-model, the target segmentation sub-model may obtain the first segmentation result of the portion of the target region included in the target image.

Referring to the above example, the first segmentation module 430 may input a target image corresponding to the "lung tumor" in the initial image and a target image corresponding to the "bronchial tree" to the target segmentation sub-model M1 and the target segmentation sub-model M2, respectively, the target segmentation sub-model M1 may output a first segmentation result of a portion of the "lung tumor" included in the target image corresponding to the "lung tumor," and the target segmentation sub-model M2 may output a first segmentation result of a portion of the "bronchial tree" included in the target image corresponding to the "bronchial tree."

In some embodiments, the selection model and each segmentation sub-model in the plurality of segmentation sub-models may be trained separately.

In some embodiments, the second training module 450 may be configured to train the selection model based on third training samples with third sample labels. For instance, the third training sample with the third sample label may be input to the selection model, and parameters of the selection model may be updated by training. As used herein, the third training sample may include a feature of a sample target region in a sample initial image. The third sample label may be a value used to represent the segmentation sub-model. For example, the third sample label may include 1, 2, 3, ..., which represent segmentation sub-models M1, M2, M3, ..., respectively.

Figure 10:
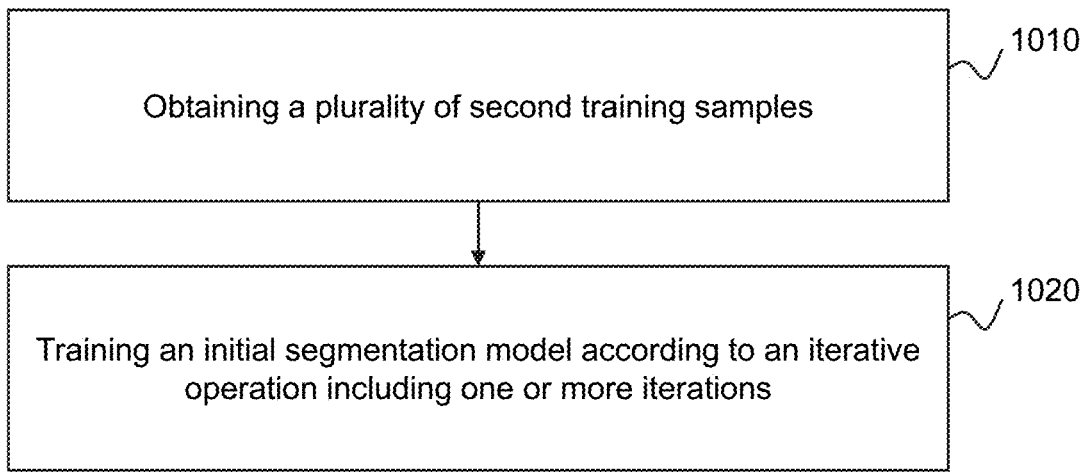
FIG. 10 is a flowchart illustrating an exemplary process for obtaining a segmentation model according to some embodiments of the present disclosure.

More descriptions of the separate training of each segmentation sub-model may be found elsewhere in the present disclosure, for example, FIG. 10 and relevant descriptions thereof, which may not be repeated herein.

In some embodiments, the second training module 450 may train the selection models and the plurality of segmentation sub-models in the segmentation model via end-to-end training. For instance, fourth training samples with fourth sample labels may be input the segmentation model, the parameters of the segmentation model may be updated by training, and the trained segmentation model may be obtained until the trained selection models and the plurality of trained segmentation sub-models meet a preset condition. The preset condition may include that a loss function is less than a threshold, the segmentation model is converged, a count (or number) of training times reaches a time threshold, etc. More descriptions of the fourth sample label and the fourth training sample may be found elsewhere in the present disclosure, for example, the first sample label, the first training sample, and relevant descriptions thereof, which may not be repeated herein.

In some embodiments, after the target region in each target image is segmented, the first segmentation result of the target region may be displayed directly in the target image.

In some embodiments, the process 500 may include determining a target segmentation result of the target region in the initial image based on the at least one initial segmentation result (also referred to the at least one first segmentation result). The operation may be performed by the first segmentation module 430.

The target segmentation result of the target region (also referred to a first target segmentation result of the target region) may indicate a location or region of the target region in the initial image.

For example, the first segmentation module 430 may obtain the first target segmentation result of the target region of the 2D image (or the 3D image) based on the first segmentation result of the plurality of 2D image blocks (or 3D image blocks). For instance, the first segmentation module 430 may obtain the first target segmentation result of the target region in the initial image by displaying the first segmentation result of the plurality of 2D image blocks (or 3D image blocks) at a corresponding location in the initial image.

As another example, the first segmentation module 430 may obtain the first target segmentation result of the 3D image (e.g., the 3D medical image) based on the first segmentation result of the plurality of tomographic images. For instance, the first segmentation module 430 may reconstruct the 3D image based on the plurality of tomographic images using surface rendering or a volume rendering. The surface rendering may include a boundary contour representation, a surface curve representation (e.g., cuberille, marching cubes, dividing cubes, etc.), etc. The volume rendering may include a spatial domain technique (e.g., a ray tracking technique, a splatting technique, a shear-warp technique, etc.), a transform domain technique (e.g., a frequency domain volume rendering, a wavelet-based volume rendering, etc.), etc. After obtaining the 3D image, the first segmentation module 430 may determine the target segmentation result of the 3D image by mapping the at least one first segmentation result to the 3D image. Merely by way of example, the first segmentation module 430 may determine which pixels in each target image belong to the target region based on the first segmentation result, and further determine voxels corresponding to the pixels in the 3D image. Subsequently, the first segmentation module 430 may highlight the voxels. For example, the voxels may be displayed in the 3D medical image in color, such as red, thereby distinguishing displayed colors of other voxels that do not belong to the target region.

It should be noted that the description of the process 500 is merely for example and illustration, and not intended to limit the scope of the present disclosure. For those skilled in the art, various variations or modifications of the process 500 may be made under the teachings of the present disclosure. However, those variations and modifications do not depart from the scope of the present disclosure.

FIG. 5B is a flowchart illustrating an exemplary process for determining at least one target image according to some embodiments of the present disclosure. In some embodiments, process 550 may be implemented as a set of instructions (e.g., an application) stored in the storage device 150, storage 220, or storage 390. The processing device 110 (e.g., the processor 210, the CPU 340, and/or one or more modules illustrated in FIG. 4) may execute the set of instructions, and when executing the instructions, the processing device 110 may be configured to perform the process 550. The operations of the illustrated process presented below are intended to be illustrative. In some embodiments, the process 550 may be accomplished with one or more additional operations not described and/or without one or more of the operations discussed. Additionally, the order of the operations of process 550 illustrated in FIG. 5B and described below is not intended to be limiting. In some embodiments, one or more operations of the process 550 may be performed to achieve at least part of operation 520 as described in connection with FIG. 5A. As shown in FIG. 5B, the process 550 may include one or more of the following operations.

In 552, the processing device 110 (e.g., the target image determination module 420) may determine a plurality of sub-images of an initial image. The sub-image may be an image for reconstructing and/or constituting the initial image. In some embodiments, the sub-image may include an image block of the initial image. In some embodiments, the image block may be a partial image for constituting the initial image. In some embodiments, the target image determination module 420 may extract the plurality of sub-images from the initial image through a multi-scale sliding-window, a selective search, a neural network, or other techniques.

Figure 6A:
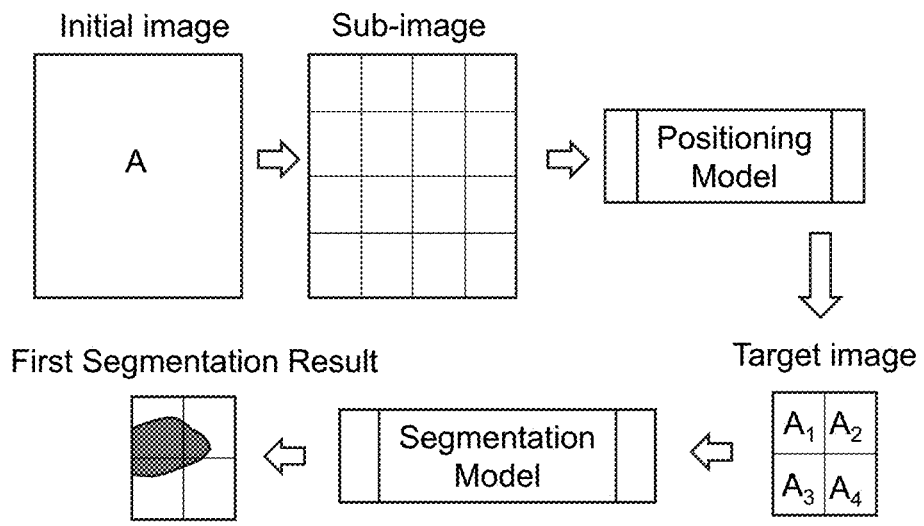
FIG. 6A is a schematic diagram illustrating an exemplary process for image segmentation of a two-dimensional image according to some embodiments of the present disclosure.

In some embodiments, the initial image may include a 2D image (e.g., a 2D medical image), and the sub-image may include a 2D image block of the 2D image. Merely by way of example, taking the multi-scale sliding-window as an example, if the initial image is a 2D image with 200×200 pixels, the target image determination module 420 may first obtain 190×190 image blocks from the initial image by sliding in a step of 1 through a sliding window with a scale of 10×10 pixels, then obtain 180×180 image blocks from the initial image by sliding in a step of 2 through a sliding window with a scale of 20×20 pixels, . . . , and finally obtain 190×190+180×180+ . . . image blocks. As used herein, the scale of the sliding window, the step, and/or the count (or number) of image blocks may be preset parameters. As shown in FIG. 6A, FIG. 6A is a schematic diagram illustrating an exemplary process for image segmentation of a two-dimensional image according to some embodiments of the present disclosure. The target image determination module 420 may obtain the plurality of sub-images by extracting a plurality of 2D image blocks from a 2D initial image A.

Figure 6B:
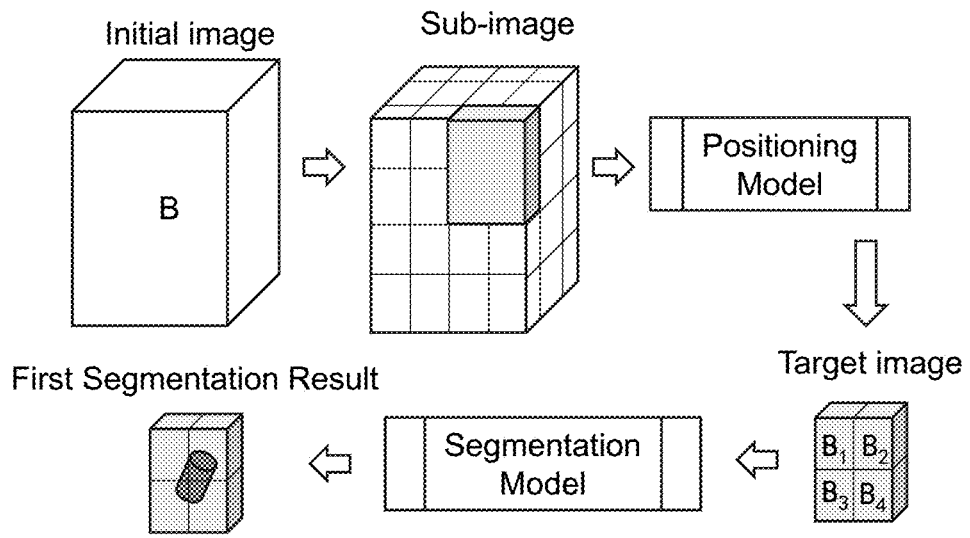
FIG. 6B is a schematic diagram illustrating an exemplary process for image segmentation of a three-dimensional image according to some embodiments of the present disclosure.

In some embodiments, the initial image may include a 3D image (e.g., a 3D medical image), and the sub-image may include a 3D image block of the 3D image. Merely by way of example, if the initial image is a 3D image with 200×200×200 pixels, the target image determination module 420 may obtain 9000 3D image blocks from the initial image based on a neural network. As shown in FIG. 6B, FIG. 6B is a schematic diagram illustrating an exemplary process for image segmentation of a three-dimensional image according to some embodiments of the present disclosure. The target image determination module 420 may obtain the plurality of sub-images by extracting a plurality of 3D image blocks from a 3D initial image B.

Figure 6C:
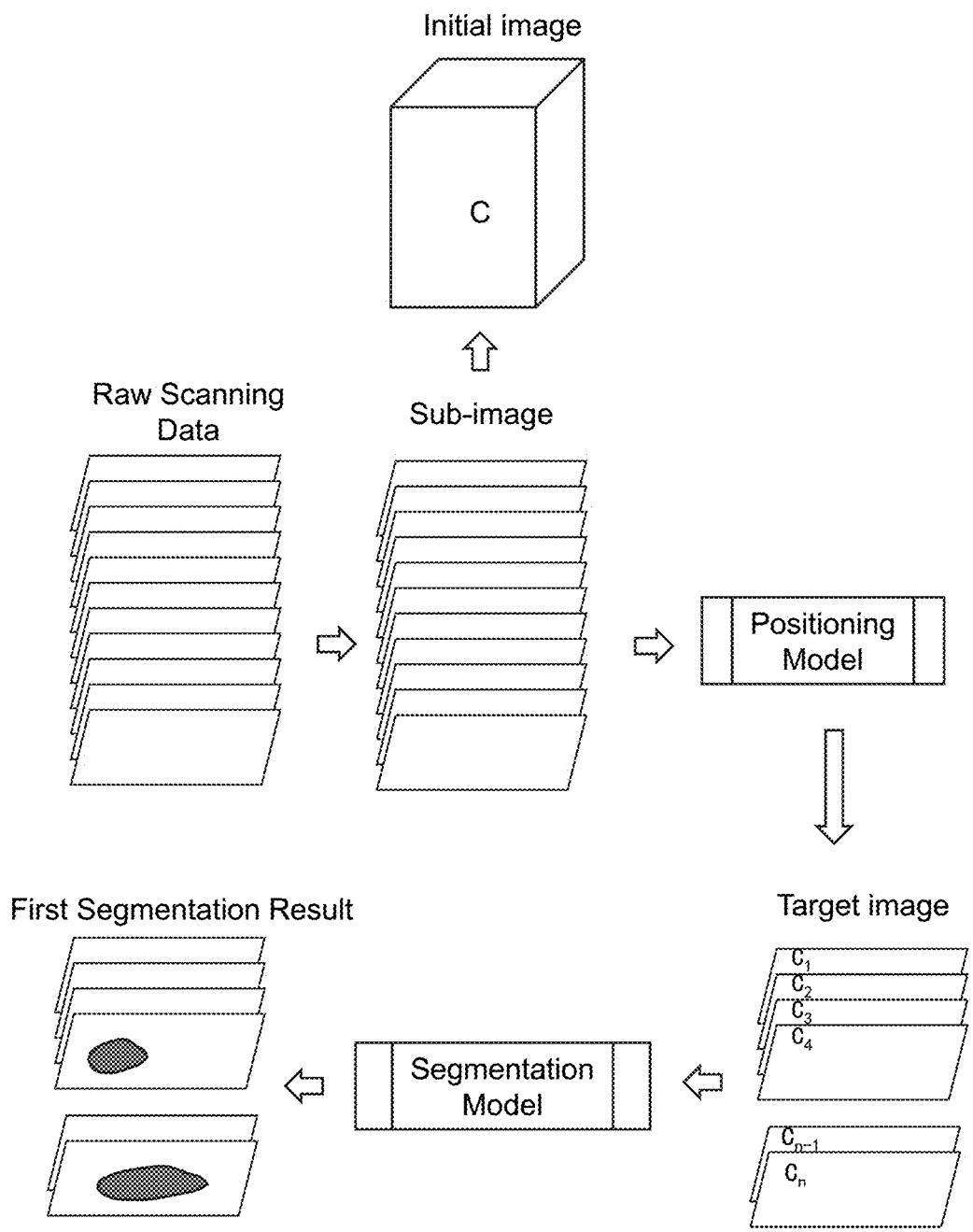
FIG. 6C is a schematic diagram illustrating another exemplary process for image segmentation of a three-dimensional image according to some embodiments of the present disclosure.

In some embodiments, the sub-image may include a tomographic image for reconstructing the initial image (e.g., the 3D image). For instance, if the initial image is obtained based on reconstruction of 100 tomographic images, the sub-images may include the 100 tomographic images. As shown in FIG. 6C, FIG. 6C is a schematic diagram illustrating another exemplary process for image segmentation of a three-dimensional image according to some embodiments of the present disclosure. The target image determination module 420 may obtain a plurality of tomographic images based on raw scanning data of a 3D initial image C.

More descriptions of the obtaining of the tomographic images may be found elsewhere in the present disclosure, for example, operation 510 and relevant descriptions thereof, which may not be repeated herein.

In some embodiments, the target image determination module 420 may extract a portion from the plurality of image blocks that construct and/or constitute the initial image as the sub-image(s). For example, as shown in FIG. 6A, the target image determination module 420 may extract 20000 image blocks from 40000 image blocks of the initial image A as the sub-images of the initial image A. As another example, as shown in FIG. 6C, the target image determination module 420 may extract 200 tomographic images from 500 tomographic images of the initial image C as the sub-images of the initial image C.

It may be understood that a portion of image blocks and/or tomographic images may be extracted as the sub-images, which can improve the efficiency of the positioning model in determining the target image and the segmentation model in obtaining the segmentation result (e.g., the initial segmentation result and/or the target segmentation result).

In some embodiments, the target image determination module 420 may determine at least one feature parameter based on at least one feature of the target region.

In some embodiments, the target region may be an ROI in the initial image. The ROI may include a target volume and/or an OAR. Accordingly, a background region may be a portion of the initial image other than the target region (e.g., the ROI) in the initial image. For example, if the initial image is a lung image of a patient, the target region may include different tissues (e.g., a target volume "a tumor region of a lung" and an OAR "a bronchial tree of the lung") in the lung image of the patient, and the background region may include regions other than "the tumor region of the lung" and "the bronchial tree of the lung" in the lung image of the patient.

The feature of the target region may be a feature that characterizes a degree of segmentation difficulty of the target region. In some embodiments, the feature of the target region may include a type of the target region, a size of the target region, information of a target subject, or the like, or any combination thereof. The type of the target region may include a type (e.g., the target volume, a regular OAR, a complex OAR) of the ROI in the target region and/or a type (e.g., a lung, a heart, a brain) of the tissue which the target region belongs to. The size of the target region may include a volume and/or a plane projection area of the target region. The information of the target subject may include an age, a gender, a smoking history, and/or a lung function of the target subject.

In some embodiments, the first segmentation module 430 may obtain the at least one feature of the target region input by a user from the terminal(s) 140. For instance, the user (e.g., a radiotherapist) may determine, based on a segmentation requirement of a treatment plan, that the target region in the initial image includes a target volume "a lung tumor" and an OAR "a bronchial tree" in the initial image, thereby selecting "the target volume" and "the complex OAR" as the type of the target region. Then, the terminal(s) 140 may send the type of the target region to the first segmentation module 430.

In some embodiments, the first segmentation module 430 may obtain the at least one feature of the target region from the storage device 150. For instance, the first segmentation module 430 may obtain the information of the target subject from the treatment plan stored in the storage device 150.

In some embodiments, the first segmentation module 430 may automatically determine the type of the target region based on the initial image. For instance, the first segmentation module 430 may automatically determine the size of the target region based on the initial image.

The feature parameter may be one or more parameters related to extracting the sub-image. In some embodiments, the feature parameter may include an extraction ratio and/or an extraction interval.

As used herein, the extraction ratio may be a ratio of a count (or number) of extracted sub-images and a total count (or number) of sub-images. It may be understood that, the greater the extraction ratio, the higher the accuracy of image segmentation, and the smaller the extraction ratio, the higher the efficiency of image segmentation. For example, if 200 tomographic images are extracted from 500 tomographic images of the initial image C as the sub-images of the initial image C, the extraction ratio of the initial image C may be 0.4.

The extraction interval may indicate a distribution of the extracted sub-images in the whole sub-images. It may be understood that, the less the extraction interval, the higher the accuracy of image segmentation, and the larger the extraction interval, the higher the efficiency of image segmentation.

Figure 7A:
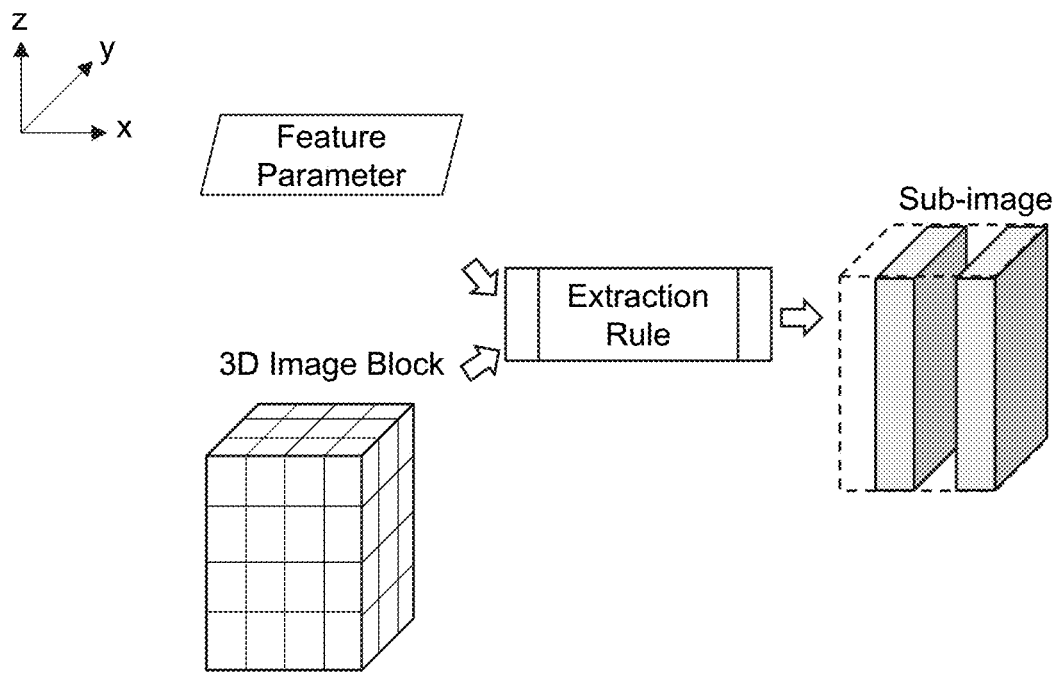
FIG. 7A is a schematic diagram illustrating an exemplary process for extracting a sub-image from a three-dimensional image block according to some embodiments of the present disclosure.

In some embodiments, the extraction interval may be equidistant. FIG. 7A is a schematic diagram illustrating an exemplary process for extracting a sub-image from a three-dimensional image block according to some embodiments of the present disclosure. As shown in FIG. 7A, an extraction interval corresponding to 3D image blocks of an initial image may be one image block evenly spaced in an X-axis direction (indicated by dashed lines).

Figure 7B:
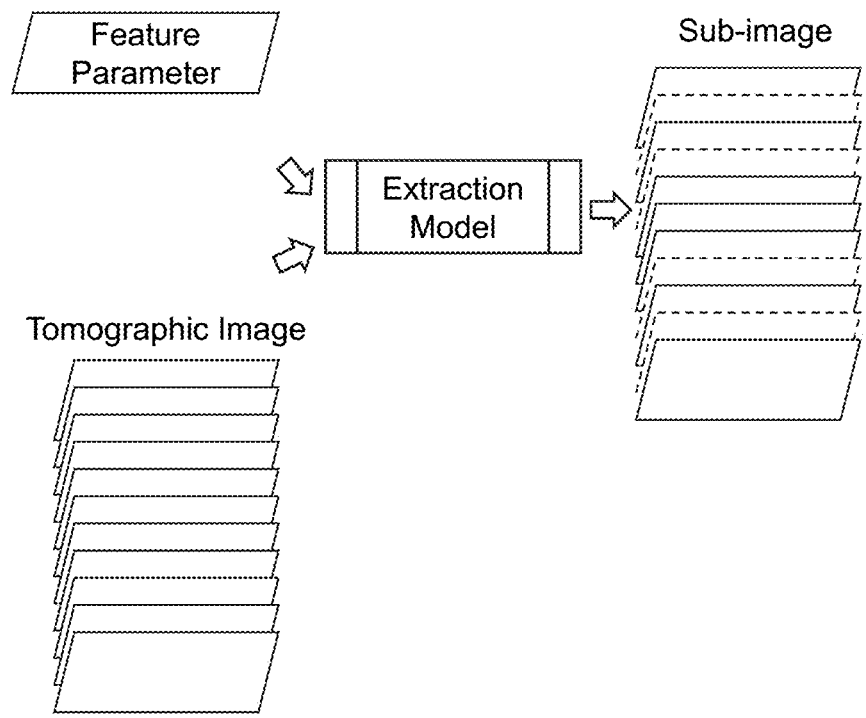
FIG. 7B is a schematic diagram illustrating an exemplary process for extracting a sub-image from a tomographic image according to some embodiments of the present disclosure.

In some embodiments, the extraction interval may be unequidistant. FIG. 7B is a schematic diagram illustrating an exemplary process for extracting a sub-image from a tomographic image according to some embodiments of the present disclosure. As shown in FIG. 7B, tomographic images may be extracted without an interval in a middle region of an initial image (i.e., the extraction interval is 0), and one tomographic image may be extracted from every two images (indicated by dashed lines) in other regions of the initial image.

In some embodiments, the target image determination module 420 may determine the at least one feature parameter based on an extraction rule and/or the feature of the target region. For example, the extraction rule may include that if the target region is the lung, a corresponding extraction ratio may be 0.4, if the target region is the heart, a corresponding extraction ratio may be 0.7, and/or if the target region is the brain, a corresponding extraction ratio may be 0.9. As another example, the extraction rule may further include that if the target region is in a location where the target volume and/or the complex OAR is located, the extraction interval may be set as one image block in a Y-axis direction in the location where the target volume and/or the complex OAR is located, if the target region is in a location where the regular OAR is located, the extraction interval may be set as three image blocks in a Y-axis direction in the location where the target volume and/or the complex OAR is located, and/or if the target region is in a location where a phantom is located, the extraction interval may be set as two image blocks in the X-axis direction, the X-axis direction, and/or an X-axis direction. The X-axis direction may be a width direction of a plane of a treatment bed of the RT device 130, the Y-axis direction may be a length direction of the plane of the treatment bed of the RT device 130, and the Z-axis direction may be a direction perpendicular to the plane of the treatment bed of the RT device 130.

In some embodiments, the target image determination module 420 may determine the at least one feature parameter based on the feature of the target region using an extraction model. An input of the extraction model may include a feature vector of the target region, and an output of the extraction model may include the at least one feature parameter. As used herein, each element of the feature vector of the target region may indicate one feature of the target region. In some embodiments, the feature of the target region may be represented by a numerical value. For example, the value "1" may be used to indicate that the type of the target region is the target volume, the value "2" may be used to indicate that the type of the target region is the OAR, and the value "3" may be used to indicate that the type of the target region is the phantom. As another example, the value "1" may be used to indicate that the target region is the lung, the value "2" may be used to indicate that the target region is the heart, and the value "3" may be used to indicate that the target region is the brain. As still another example, the value "10" may be used to indicate that the projection area of the target region is 10 square centimeters. As still another example, the value "1" may be used to indicate that the gender of the target subject is male, and the value "0" may be used to indicate that the gender of the target subject is female. For instance, a feature vector (1, 1, 10, 0) may indicate that the type of the target region is the target volume of the lung, the projection area of the target region is 10 square centimeters, and the gender of the target subject is female.

In some embodiments, the extraction model may map the feature vector of the target region to a numerical value or a probability, and then obtain a corresponding feature parameter based on the numerical value or probability. In some embodiments, the extraction model may include a support vector machine model, a logistic regression model, a simple Bayes classification model, a Gaussian distribution-Bayesian classification model, a decision tree model, a random forest model, a KNN classification model, a neural network Model, or the like, or any combination thereof.

In some embodiments, the target image determination module 420 may obtain at least one sub-image from the initial image based on the at least one feature parameter.

As shown in FIG. 7A, the target image determination module 420 may extract a plurality of image blocks from the 3D image blocks as the sub-images based on the feature parameter "extracting evenly with an extraction interval of one image block in the X-axis direction" determined according to the extraction rule.

As shown in FIG. 7B, the target image determination module 420 may extract a plurality of image blocks from the 3D image blocks as the sub-images based on the feature parameter "extracting tomographic images without an interval in the middle region of the initial image, and extracting tomographic images with an extraction interval of one tomographic image in other regions of the initial image" using the extraction model.

In some embodiments of the present disclosure, a portion of sub-images may be extracted from the plurality of sub-images in the initial image for the segmentation of the target region based on the at least one feature parameter, which can improve the segmentation efficiency and the segmentation effect.

In 554, the processing device 110 may obtain a plurality of preprocessed sub-images by preprocessing the plurality of sub-images, respectively.

In some embodiments, the preprocessing may at least include the image normalization, image resampling, or the like, or any combination thereof. In some embodiments, the preprocessing may at least include the image normalization. In some embodiments, each pixel point in the initial image may correspond to a physical dimension, and the image resampling may be used to resample the physical dimension (including physical dimensions along the X, Y, and/or Z directions) corresponding to each pixel point in the sub-image to a same size. The image normalization (or image standardization) may be used to convert an image (or sub-image) to be processed into a corresponding unique standard form through a series of transformations (e.g., using an invariant matrix of the image (or sub-image) to find or determine a set of parameters that eliminate an effect of other transformation functions on image transformation). The standard form of image (or sub-image) may have an invariant feature with regard to an affine translation, such as translation, rotation, zooming, etc. The image normalization may include coordinate centering, X-shearing normalization, zooming normalization, rotation normalization, etc. For example, the image normalization may include mapping an attribute (e.g., a pixel value) of each pixel of the image (or sub-image) to a particular section (e.g., [−1,1]) or a specific distribution (e.g., a normal distribution, a distribution with an average of 0 and a variance of 1), including min-max standardization, z-score standardization, etc. The standardized image may be suitable for a process of a machine learning model. The plurality of preprocessed sub-images may include uniform features (e.g., image scale, distribution section of pixel values, etc.).

In 556, the processing device 110 may determine at least one target image from the plurality of preprocessed sub-images using a positioning model. In some embodiments, each of the at least one target image may include a portion of the target region.

In some embodiments, if the initial image is a 2D image, and the sub-images are 2D image blocks of the 2D image, the target image may include a 2D image block of the 2D image. As shown in FIG. 6A, the initial image A may be a 2D image, and target images $A_1, A_2, A_3$, and $A_4$ corresponding to the initial image A may be 2D image blocks.

In some embodiments, if the initial image is a 3D image, and the sub-images are 3D image blocks of the 3D image, the target image may include a 3D image block of the 3D image. As shown in FIG. 6B, the initial image B may be a 3D image, and target images $B_1, B_2, B_3$, and $B_4$ corresponding to the initial image B may be 3D image blocks.

In some embodiments, if the initial image is a 3D image, and the sub-images are tomographic images of the 3D image, the target image may include a tomographic image of the 3D image. As shown in FIG. 6C, the initial image C may be a 3D image, and target images $C_1, C_2, C_3, C_4, \ldots, C_{n-1}$, and $C_n$ corresponding to the initial image C may be tomographic images.

It may be understood that in some embodiments, the target region may include a portion of the target subject. Therefore, a portion of sub-images may include the target region, and a portion of sub-images may include no target region. For example, if the target region is an OAR (the bronchial tree), and the bronchial tree exists only in the lung of the patient, a portion of sub-images may include no bronchial tree in the initial image of the lung of the patient. As shown in FIG. 6B, in the initial image B, the image blocks $B_1, B_2, B_3$, and $B_4$ may include the target region, and the target image corresponding to the initial image B may include the image blocks $B_1, B_2, B_3$, and $B_4$.

As another example, if the target region is a lung tumor that grows in the patient, the lung tumor may not exist in the whole chest of the patient. Therefore, when tomographic scanning is performed on the chest of the patient using an imaging component or device, in a plurality of sections (e.g., cross sections) corresponding to a plurality of tomographic images, a portion of the plurality of sections may not be intersected with the lung tumor. That is, a portion of the plurality of sections may not be intersected with a target volume of the lung tumor. The portion of the plurality of tomographic images may not include a portion of the lung tumor. Based on the above description, a tomographic image that includes an intersection of the target volume and a corresponding section may be determined as the target image. The target image may include a portion of the target region. The portion of the target region may indicate a section part formed by the intersection of the section corresponding to the target image and the target region. As shown in FIG. 6C, in the initial image C, the tomographic images $C_1, C_2, C_3, C_4, \ldots, C_{n-1}$, and $C_n$ may include a section part formed by the intersection of the section and the target region, and thus the target image corresponding to the initial image C may include the tomographic images $C_1$, $C_2$, $C_3$, $C_4$, ..., $C_{n-1}$, and $C_n$.

In some embodiments, the target image determination module 420 may determine the at least one target image using the positioning model to process the plurality of sub-images. The positioning model may include a machine learning-based classification model, such as a decision tree, an artificial neural network model, a multi-layer perception machine, a KNN, a support vector machine (SVM), a simple Bayes model, an Adaboost model, a logic regression model, a random forest, a gradient boost tree, a gradient boosted decision tree (GBDT), etc. Exemplary artificial neural network models may include a neural network-based deep learning model, such as CNN, DNN, an ImageNet, a visual geometry group network (VGG-Net), a deep residual network (ResNet), a dense convolutional network (Densenet), a rethinking model scaling for convolutional neural network (EfficientNet), etc. The target image determination module 420 may obtain a corresponding determination result by inputting the sub-image to the trained positioning model. The determination result may indicate whether the sub-image includes a portion of the target region, which may be represented by an identifier. For example, the positioning model may output 1 or 0. The value "1" may indicate that the sub-image includes a portion of the target region, and the value "0" may indicate that the sub-image includes no portion of the target region.

As shown in FIG. 6B, the target image determination module 420 may input the plurality of image blocks of the initial image B to the trained positioning model, and output a determination result "1" corresponding to the image blocks $B_1$, $B_2$, $B_3$, and $B_4$, indicating that the image blocks $B_1$, $B_2$, $B_3$, and $B_4$ include a portion of the target region, respectively. A determination result "0" corresponding to other image blocks may indicate that the other image blocks include no portion of the target region and are not determined as the target image.

In some embodiments, the input of the positioning model may further include location information of the target region and/or an auxiliary positioning rule of the target region.

The location information of the target region may characterize a location of the target region in the target subject. For example, if the target region is a target volume of rectal cancer, the location information of the target region may include that "a tumor is 3 centimeters from the right side of the patient's anus." In some embodiments, the location information of the target region may be obtained based on clinical information of the target subject. Referring to the above example, the location information may be obtained based on information of anal finger examination on the patient. In some embodiments, the target image determination module 420 may obtain the location information of the target region input by the user via the terminal(s) 140. Alternatively, the location information of the target region may be obtained based on the clinical information of the target subject stored in the storage device 150.

The auxiliary positioning rule of the target region may assist the positioning model to narrow a positioning range. For example, if the target region is a target volume of breast cancer, the corresponding auxiliary positioning rule may include that "the target region is located within a range below a clavicle of the patient and above a positioning mark affixed to a body surface." It may be understood that different target regions may correspond to different auxiliary positioning rules, so that the positioning model may quickly determine the target image based on different features of different target regions, and improve the efficiency of image segmentation. In some embodiments, the target image determination module 420 may obtain the auxiliary positioning rule of the target region input by a user through the terminal(s) 140. In some embodiments, the storage device 150 may store different auxiliary positioning rules corresponding to different regions in advance, and the target image determination module 420 may obtain the auxiliary positioning rule corresponding to the target region from the storage device 150 based on the type of the target region.

For instance, the positioning model may first map the location information of the target region and/or the auxiliary positioning rule of the target region to a location information representation vector and/or an auxiliary positioning rule representation vector using a word vector embedding model, and then determine the at least one target image based on the plurality of sub-images, the location information representation vector, and/or the auxiliary positioning rule representation vector.

In some embodiments of the present disclosure, the at least one target image may be determined based on the location information of the target region and/or the auxiliary positioning rule of the target region, which can improve the accuracy of the positioning model.

As shown in FIG. 6C, the target image determination module 420 may input the plurality of tomographic images of the initial image C to the trained positioning model, and output the determination result "1" corresponding to the tomography images $C_1$, $C_2$, $C_3$, $C_4$, ..., $C_{n-1}$, and $C_n$, indicating that the tomographic images $C_1$, $C_2$, $C_3$, $C_4$, ..., $C_{n-1}$, and $C_n$ include a portion of the target region, respectively, and are determined as the target images. The determination result "0" corresponding to other tomographic images may indicate that the other tomographic images include no portion of the target region, and are not the target image.

In some embodiments, the positioning model may be obtained by training using training samples. In some embodiments, the training samples may include a plurality of sample sub-images each of which includes a portion of a sample region and/or a plurality of sample sub-images each of which includes no portion of the sample region. Each sample sub-image may include a sample label that can be used to indicate whether the sample sub-image includes a portion of the sample region. In some embodiments, a training sample may further include sample location information and/or a sample auxiliary positioning rule. During training, the training samples may be input to the positioning model. Parameters of the positioning model may be updated during the training based on a difference between a determination (obtained by the positioning model) whether the sample sub-image includes a portion of the sample region and the sample label of the sample sub-image. When a preset training condition (e.g., a count (or number) of training times reaches a preset training time or the difference is less than a preset threshold) is reached, the training may be terminated and the trained positioning model may be obtained. More descriptions of the training of the positioning model may be found elsewhere in the present disclosure, for example, FIG. 9 and relevant descriptions thereof, which may not be repeated herein.

In some embodiments of the present disclosure, a sub-image including a portion of the target region (i.e., a target image) may be first determined, and then the determined sub-image may be segmented, which can save computing time and computing resources for subsequently obtaining of the segmentation result (e.g., the initial segmentation result, or the target segmentation result).

Figure 8:
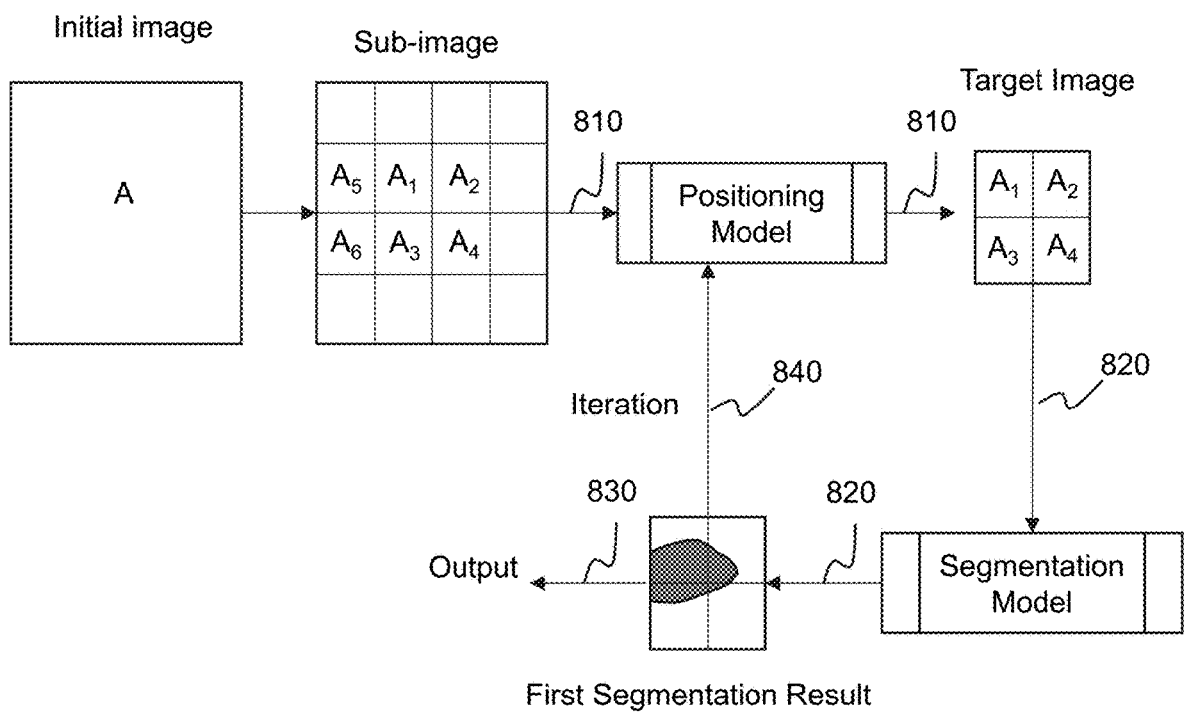
FIG. 8 is a flowchart illustrating an exemplary process for obtaining a target segmentation result by performing an iterative process based on a positioning model and a segmentation model according to some embodiments of the present disclosure.

FIG. 8 is a flowchart illustrating an exemplary process for obtaining a target segmentation result by performing an iterative process based on a positioning model and a segmentation model according to some embodiments of the present disclosure.

In some embodiments, the process 800 may be implemented in the processing device 110 illustrated in FIG. 1. For example, the process 800 may be stored in the storage device 150 and/or the storage (e.g., the storage 220, the storage 390) as a form of instructions, and invoked and/or executed by the processing device 110 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 500 may be accomplished with one or more additional operations not described, and/or without one or more of the operations discussed. Additionally, the order in which the operations of the process 800 as illustrated in FIG. 8 and described below is not intended to be limiting. In some embodiments, the process 800 may be executed by the image segmentation system 400. As shown in FIG. 8, the process 800 may include one or more of the following operations.

In 810, a positioning model may be used to determine at least one target image based on an initial segmentation result of a portion of a target region. The operation 810 may be performed by the target image determination module 420.

In some embodiments, an input of the positioning model may include the initial segmentation result (also referred to as the first segmentation result) of the portion of the target region. For instance, after a segmentation model outputs the initial segmentation result (also referred to as the first segmentation result) of the portion of the target region, during a first iteration, the input of the positioning model may include a plurality of sub-images in an initial image and the initial segmentation result of the portion of the target region, so that the positioning model may obtain more information relating to the plurality of sub-images and the target region based on the first segmentation result, thereby optimizing a positioning result (i.e., the target image) output by the positioning model during the first iteration.

As shown in FIG. 8, the first segmentation result may indicate that a portion of the target region is located on left edges of target images $A_1$ and $A_3$. During the first iteration, after the positioning model learns from information of the first segmentation result, sub-images $A_5$ and $A_6$ on a left side of the target images $A_1$ and $A_3$ in the initial image may also be output as the target image.

In some embodiments, operation 810 may be similar to the operation 520 in the process 500, and may not be repeated herein.

In 820, for each of the at least one target image, the segmentation model may determine the first segmentation result of a portion of the target region. The operation 820 may be performed by the first segmentation module 430. In some embodiments, operation 820 may be similar to the operation 530 in the process 500, and may not be repeated herein.

Referring to the above example, during the first iteration, the segmentation model may obtain an updated first segmentation result (not shown) based on updated target images $A_1$, $A_2$, $A_3$, $A_4$, $A_5$, and $A_6$.

In 830, in response to that the first segmentation result satisfies a preset condition, the first segmentation result may be output as a target segmentation result (or a portion thereof) (also referred to as a first target segmentation result). The operation 830 may be performed by the first segmentation module 430.

The preset condition may be a condition that the target segmentation result satisfies segmentation requirements of a user. It may be understood that in some embodiments, the segmentation result(s) of the target image(s) by the image segmentation system may include an error, so that the first segmentation result does not satisfy the segmentation requirements. For example, if the positioning model determines the sub-image including the target region as a sub-image including no target region, or determines the sub-image including no target region as a sub-image including the target region, the first segmentation result may not satisfy the preset condition. As another example, if the segmentation model determines the target region as a background region or determines the background region as the target region, the first segmentation result may not satisfy the preset condition.

Therefore, the first segmentation module 430 may send the first segmentation result to the terminal(s) 140, and receive a determination of the user whether the first segmentation result satisfies the preset condition from the terminal(s) 140.

For instance, in response to that the first segmentation result output in the first iteration satisfies the preset condition, the first segmentation module 430 may output the first segmentation result as the first target segmentation result (or a portion thereof).

In 840, in response to that the first segmentation result does not satisfy the preset condition, a next iteration may be performed. The operation 840 may be performed by the first segmentation module 430.

For instance, in response to that the first segmentation result output in the first iteration does not satisfy the preset condition, the first segmentation module 430 may designate the sub-image and/or the updated first segmentation result as an input of the positioning model in a second iteration.

Further, the processing device 110 may iterate the operation 520, until the first target segmentation result is obtained.

Figure 9:
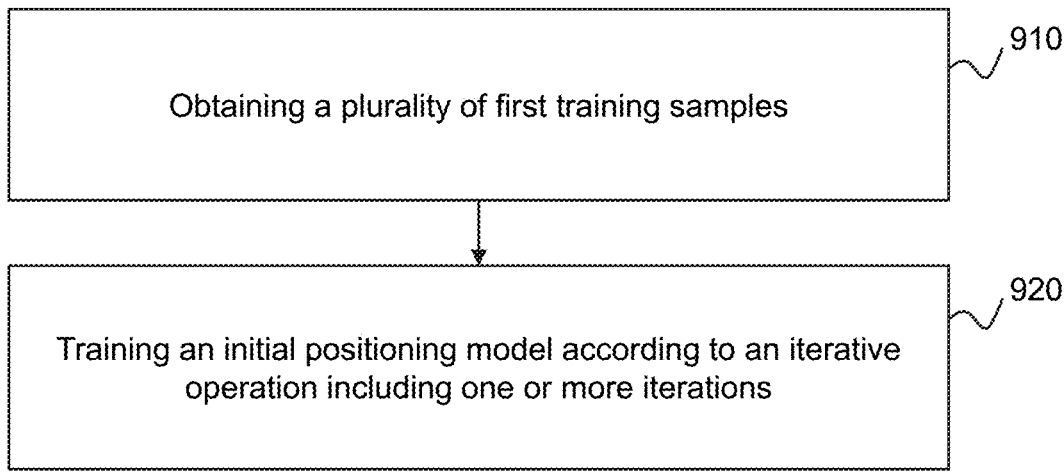
FIG. 9 is a flowchart illustrating an exemplary process for obtaining a positioning model according to some embodiments of the present disclosure.

FIG. 9 is a flowchart illustrating an exemplary process for obtaining a positioning model according to some embodiments of the present disclosure. In some embodiments, the process 900 may be implemented in the processing device 110 illustrated in FIG. 1. For example, the process 900 may be stored in the storage device 150 and/or the storage (e.g., the storage 220, the storage 390) as a form of instructions, and invoked and/or executed by the processing device 110 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting. In some embodiments, the process 900 may be executed by the image segmentation system 400 (e.g., the first training module 440). In some embodiments, the process 900 may be performed by other processing devices other than the image segmentation system, the RT system 100, or the imaging system. As shown in FIG. 9, the process 900 may include one or more of the following operations. In some embodiments, a positioning model may be obtained based on a plurality of first training samples. The first training sample may be obtained based on a plurality of sample sub-images.

In 910, the processing device 110 may obtain a plurality of first training samples.

In some embodiments, each of the plurality of first training samples may include a first sample sub-image and a first sample label.

In some embodiments, the first sample sub-image may be obtained based on a sample sub-image of a sample subject. For example, the first sample sub-images may be obtained by preprocessing (e.g., performing image normalization and/or image resampling) tomographic images of a plurality of patients. As another example, the first sample sub-images may be obtained by segmenting sample initial images of a plurality of phantoms into a plurality of image blocks and preprocessing the plurality of image blocks.

The first sample label may be configured to indicate whether the first sample sub-image includes a portion of a sample region. For example, if the first sample sub-images are obtained from tomographic images of a plurality of patients with lung cancer, the first sample label may be configured to indicate whether the first sample sub-image includes a portion of a lung tumor or an OAR. As another example, if the first sample sub-images are obtained from block images of sample images of a plurality of phantoms, the first sample label may be configured to indicate whether the first sample sub-image includes a portion of the phantoms.

In some embodiments, the first sample label may be represented using numbers, characters, identifiers, or the like, or any combination thereof. For example, the first sample label may include 1 or 0. The value "1" may indicate that the sample sub-image includes a portion of the sample region, and the value "0" may indicate that the sample sub-image includes no portion of the sample region. In some embodiments, the sample region may be a same type of the target region. For example, the first sample sub-images may be tomographic images and/or image blocks from a plurality of patients with a same tumor (e.g., the plurality of patients with lung cancer).

In some embodiments, the plurality of first training samples may be predetermined. For example, the plurality of first training samples may be stored in the storage device 150. The first training module 440 may obtain the plurality of first training samples by communicating with the storage device 150 via the network 120.

In 920, the processing device 110 may obtain a positioning model by training an initial positioning model according to an iterative operation including one or more iterations.

In some embodiments, the positioning model may include a machine learning-based classification model, such as a decision tree, an artificial neural network, a multi-layer perception machine, a KNN, a support vector machine (SVM), a simple Bayes model, an Adaboost model, a logic regression model, a random forest, a gradient boost tree, a gradient boosted decision tree (GBDT), etc. Exemplary artificial neural network models may include a neural network-based deep learning model, such as CNN, DNN, an ImageNet, a visual geometry group network (VGG-Net), a deep residual network (ResNet), a dense convolutional network (Densenet), a rethinking model scaling for convolutional neural network (EfficientNet), etc. The operation 920 may be illustrated by taking one of the one or more iterations of training for the positioning model as an example.

In some embodiments, the first training module 440 may obtain an updated positioning model generated in a previous iteration. For the each of the plurality of first training samples, the first training module 440 may obtain a determination result of whether the first sample sub-image includes a portion of the sample region using the updated positioning model. The determination result may indicate the first sample sub-image including a portion of the sample region or the first sample sub-image including no portion of the sample region. In some embodiments, the determination result may also be represented using numbers, characters, identifiers, or the like, or any combination thereof. For example, the determination result may include 1 or 0. The value "1" may indicate that the determination result is that the sample sub-image including a portion of the sample region, and the value "0" may indicate that the determination result is that the sample sub-image including no portion of the sample region. In some embodiments, the sample region may be a same type of the target region. In some embodiments, the first training module 440 may determine a first difference between the determination result corresponding to the first sample sub-image and the first sample label. The first difference may be configured to indicate whether the determination result corresponding to the first sample sub-image is the same as the first sample label. For example, the first difference may be that the determination result corresponding to the first sample sub-image is the same as the first sample label. For instance, the determination result corresponding to the first sample sub-image and the first sample label may indicate that the first sample sub-image includes a portion of the sample region. As another example, the first difference may be that the determination result corresponding to the first sample sub-image is different from the first sample label. For instance, the determination result corresponding to the first sample sub-image may indicate that the first sample sub-image includes a portion of the sample region, and the first sample label may indicate that the first sample sub-image includes no portion of the sample region. In some embodiments, the first difference may also be represented using numbers, characters, identifiers, or the like, or any combination thereof. For example, the first difference may include 1 or 0. The value "1" may indicate that the determination result corresponding to the first sample sub-image is the same as the first sample label, and the value "0" may indicate that the determination result corresponding to the first sample sub-image is different from the first sample label. It may be understood that when the first difference is "1", it may indicate that the determination result of the updated positioning model on the first sample sub-image is correct, and the updated positioning model needs to be maintained. When the first difference is "0", it may indicate that the determination result of the updated positioning model on the first sample sub-image is wrong, and the updated positioning model needs to be updated. In some embodiments, the first training module 440 may update at least one first model parameter of the updated positioning model based on the first difference. For example, if the updated positioning model is a decision tree, the first training module 440 may adjust a feature selected when a node is branched and a feature value corresponding to the feature, so that a final determination result may be consistent with the first sample label.

In some embodiments, after the one or more iterations, when a first preset condition is satisfied, the first training module 440 may terminate training and obtain the positioning model. The first preset condition may include that the accuracy of the positioning model is larger than a first threshold. The first threshold may be a preset value, for example, 95%, 96%, 97%, 98%, or the like. Merely by way of example, the first training module 440 may process a plurality of first test samples using the updated positioning model after the one or more iterations. The first test sample may be similar to the first training sample, including a first test sample sub-image and a first test sample label. In some embodiments, the first test sample sub-image may be different from the plurality of first sample sub-images. Alternatively, the first test sample sub-image may belong to the plurality of first sample sub-images, but may not be used in the training of the updated positioning model. The first test sample label may be similar to the first sample label, which can be used to indicate whether the first test sample sub-image includes a portion of a test sample region. If a determination result of the updated positioning model after the one or more iterations on the first test sample sub-image is the same as the first test sample label corresponding to the first test sample sub-image, the determination result may be considered to be accurate. The accuracy of the updated positioning model may be determined based on a plurality of determination results of the plurality of first test sample sub-images. When the accuracy is larger than the first threshold, the training may be terminated. The first training module 440 may obtain the positioning model after the training.

It should be noted that the description of the process 900 is merely for example and illustration, and not intended to limit the scope of the present disclosure. For those skilled in the art, various variations or modifications of the process 900 may be made under the teachings of the present disclosure. However, those variations and modifications do not depart from the scope of the present disclosure.

FIG. 10 is a flowchart illustrating an exemplary process for obtaining a segmentation model according to some embodiments of the present disclosure. In some embodiments, the process 1000 may be implemented in the processing device 110 illustrated in FIG. 1. For example, the process 1000 may be stored in the storage device 150 and/or the storage (e.g., the storage 220, the storage 390) as a form of instructions, and invoked and/or executed by the processing device 110 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting. In some embodiments, the process 1000 may be executed by the image segmentation system 400 (e.g., the second training module 450). In some embodiments, the process 1000 may be performed by other processing devices other than the image segmentation system, the RT system 100, or the imaging system. As shown in FIG. 10, the process 1000 may include one or more of the following operations. In some embodiments, a segmentation model may be obtained based on a plurality of second training samples. The plurality of second training samples may be obtained based on a plurality of sample sub-images.

In 1010, a plurality of second training samples may be obtained.

In some embodiments, each of the plurality of second training samples may include a second sample sub-image and a second sample label. In some embodiments, the second sample sub-image may be obtained based on a sample sub-image of a sample subject. For example, the second sample sub-images may be obtained by preprocessing (e.g., performing image normalization and/or image resampling) tomographic images of a plurality of patients. As another example, the second sample sub-images may be obtained by segmenting sample initial images of a plurality of phantoms into a plurality of image blocks and preprocessing the plurality of image blocks.

The second sample sub-images may include a portion of a sample region. For example, if the second sample sub-images are obtained from tomographic images of a plurality of patients with lung tumor, each of the second sample sub-images may include a portion of the lung tumor. As another example, if the second sample sub-images are obtained from the plurality of image blocks of the sample images of the plurality of phantoms, each of the second sample sub-images may include a portion of the phantoms. The second sample label may include a sample segmentation result of the portion of the sample region. The sample segmentation result may be configured to indicate a location or a region of the portion of the sample region in the second sample sub-image. For example, the sample segmentation result may include a matrix. A size of the matrix may be consistent with a size of the second sample sub-image, and each element in the matrix may correspond to one pixel in the second sample sub-image. A value of the element may include 1 or 0. The value "1" may indicate that the pixel in the second sample sub-image corresponding to the element belongs to a portion of the sample region, and the value "0" may indicate that the pixel in the second sample sub-image corresponding to the element does not belong to the portion of the sample region.

In some embodiments, the plurality of second training samples may be predetermined. For example, the plurality of second training samples may be stored in the storage device 150. The second training module 450 may obtain the plurality of second training samples by communicating with the storage device 150 via the network 120.

In 1020, a segmentation model may be obtained by training an initial segmentation model according to an iterative operation including one or more iterations.

In some embodiments, the segmentation model may include a neural network-based deep learning model. Exemplary segmentation models may include a deep learning model based on a convolutional neural network (CNN), a deep neural network (DNN), a recurrent neural network (RNN) (including a recurrent convolutional neural network (RCNN), a fast RCNN, a faster RCNN, a "you only look once" (YOLO) model, a single shot multibox detector (SSD), etc.), a fully convolutional network (FCN), a SegNet model, a U-Net model, a V-Net model, a dilated convolution model, a refine network (RefineNet), a pyramid scene parsing network (PSPNet), or other similar neural networks. The operation 1020 may be illustrated by taking one of the one or more iterations of training for the segmentation model as an example.

In some embodiments, the second training module 450 may obtain an updated segmentation model generated in a previous iteration. For the each of the plurality of second training samples, the second training module 450 may obtain a predicted segmentation result for a portion of the sample region included in the second sample sub-image using the updated segmentation model. The predicted segmentation result may be configured to indicate the location or the region of the portion of the sample region in the second sample sub-image. For example, the predicted segmentation result may include a matrix similar to the second sample label. A size of the matrix may be consistent with the size of the second sample sub-image, and each element in the matrix may correspond to one pixel in the second sample sub-image. A value of the element may be configured to indicate a determination result of the updated segmentation model whether the pixel in the second sample sub-image corresponding to the element belongs to the portion of the sample region. For example, the value of the element may include 1 or 0. The value "1" may indicate that the updated segmentation model predicts that the pixel in the second sample sub-image corresponding to the element belongs to the portion of the sample region, and the value "0" may indicate that the updated segmentation model predicts that the pixel in the second sample sub-image corresponding to the element does not belong to the portion of the sample region.

In some embodiments, the second training module 450 may determine a second difference between the predicted segmentation result and the second sample label. The second difference may be a degree of difference between the predicted segmentation result and the second sample label, which can correspond to a degree of similarity. For example, the degree of similarity may be a count (or number) of elements (indicating that the pixels in the second sample sub-image corresponding to the elements belong to a portion of the sample region) in the predicted segmentation result that are the same as the elements (indicating that the pixels in the second sample sub-image corresponding to the elements belong to the portion of the sample region) in the second sample label. The degree of similarity may be represented by a percentage. For example, if the count (or number) of elements (indicating that the pixels in the second sample sub-image corresponding to the elements belong to the portion of the sample region) in the predicted segmentation result is 100, and a count (or number) of elements (indicating that the pixels in the second sample sub-image corresponding to the elements belong to the portion of the sample region) in the second sample label that are the same as the 100 elements in the predicted segmentation result is 80, then the degree of similarity may be 80%. Accordingly, the second difference may be 20% (i.e., 100% subtracts 80%). It may be understood that, in some embodiments, the less the second difference, the higher the segmentation accuracy of the updated segmentation model. In some embodiments, the second training module 450 may update at least one second model parameters of the updated segmentation model based on the second difference. For example, if the updated segmentation model is a CNN, the second training module 450 may adjust relevant parameters (e.g., a learning rate, a weight matrix, etc.) of the CNN in reverse based on the second difference, so that a final predicted segmentation result of the sample region may be as consistent as possible with the second sample label.

In some embodiments, after the one or more iterations of training, in response to that a second preset condition is satisfied, the second training module 450 may terminate training and obtain the trained segmentation model. The second preset condition may be used to detect a training effect of the updated segmentation model, thereby determining whether to terminate training. The second preset condition may include that a degree of similarity between the predicted segmentation result of the updated segmentation model and the second sample label is larger than a second threshold. The degree of similarity may be used during the detection process to determine whether the second preset condition is satisfied. The degree of similarity may reflect the training effect of the updated segmentation model. The degree of similarity may be determined based on a similarity measure function, for example, a dice similarity coefficient (Dice), an intersection over union (IOU) coefficient, a Hausdorff distance, a cross entropy, or the like, or any combination thereof. Taking Dice as an example, Dice may be represented according to Equation (1):

$$\text{Dice} = 2(|X| \cap |Y|)/(|X| + |Y|) \tag{1}$$

where X may represent the count (or number) of elements (indicating that the pixels in the second sample sub-image corresponding to the elements belong to the portion of the sample region) in the predicted segmentation result, Y may represent the count (or number) of elements (indicating that the pixels in the second sample sub-image corresponding to the elements belong to the portion of the sample region) in the second sample label, and |X| ∩ |Y| may represent a count (or number) of same elements between X and Y. Dice may be a value between 0 and 1. The closer to 1, the higher the degree of similarity, and the higher the prediction accuracy of the updated segmentation model. The second threshold may be a preset value, for example, 0.9, 0.95, 0.98, etc. Merely by way of example, the second training module 450 may process a plurality of second test samples using the updated segmentation model after the one or more iterations. The second test sample may be similar to the second training sample, including a second test sample sub-image and a second test sample label. The second test sample sub-image may be different from the plurality of second sample sub-images. Alternatively, the second test sample sub-image may belong to the plurality of second sample sub-images, but may not be used in the training of the updated segmentation model. The second test sample label may be similar to the second sample label, which can be used to indicate a location or a region of a portion of a test sample region in the second test sample sub-image. When the degree of similarity between the predicted segmentation result (obtained based on the updated segmentation model) of the second test sample sub-image and the second test sample label is larger than the second threshold, the predicted accuracy of the updated segmentation model may be determined to satisfy a predetermined requirement, and the training may be terminated. The second training module 450 may obtain the trained segmentation model.

It should be noted that the description of the process 1000 is merely for example and illustration, and not intended to limit the scope of the present disclosure. For those skilled in the art, various variations or modifications of the process 1000 may be made under the teachings of the present disclosure. However, those variations and modifications do not depart from the scope of the present disclosure.

Figure 11:
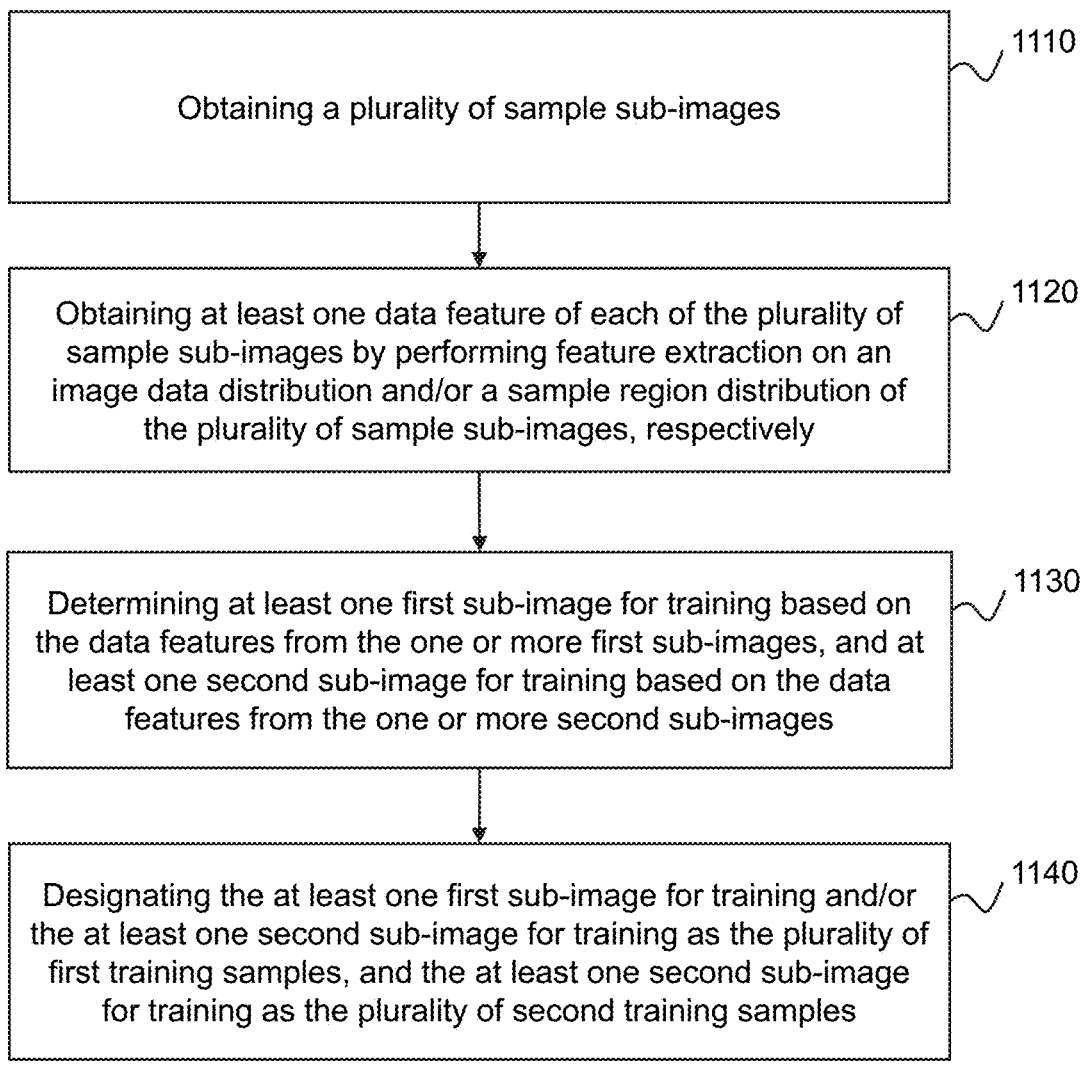
FIG. 11 is a flowchart illustrating an exemplary process for obtaining a training sample according to some embodiments of the present disclosure.

FIG. 11 is a flowchart illustrating an exemplary process for obtaining a training sample according to some embodiments of the present disclosure. In some embodiments, the process 1100 may be implemented in the processing device 110 illustrated in FIG. 1. For example, the process 1100 may be stored in the storage device 150 and/or the storage (e.g., the storage 220, the storage 390) as a form of instructions, and invoked and/or executed by the processing device 110 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1100 may be accomplished with one or more additional operations not described, and/or without one or more of the operations discussed. Additionally, the order in which the operations of the process 1100 as illustrated in FIG. 10 and described below is not intended to be limiting. In some embodiments, the process 1100 may be executed by the image segmentation system 400 (e.g., a sample obtaining module, not shown). As shown in FIG. 11, the process 1100 may include one or more of the following operations. In some embodiments, a positioning model may be obtained by training based on a plurality of first training samples, and a segmentation model may be obtained by training based on a plurality of second training samples. The first training samples and/or the second training samples may be obtained based on a plurality of sample sub-images. In some embodiments, the plurality of sample sub-images may be obtained. The sample sub-images may include one or more first sub-images and/or one or more second sub-images. In some embodiments, each of the one or more first sub-images may include no sample region, and/or each of the one or more second sub-images may include a portion of the sample regions and an original segmentation result of the portion of the sample regions. In some embodiments, the plurality of sample sub-images may be preprocessed, respectively, and the plurality of first training samples and the plurality of second training samples may be determined from the plurality of preprocessed sample sub-images. In some embodiments, at least one data feature of each of the plurality of sample sub-images may be obtained by performing feature extraction on an image data distribution and/or a sample region distribution of the plurality of sample sub-images, respectively. At least one first sub-image for training may be determined, based on the data features, from the one or more first sub-images. At least one second sub-image for training may be determined, based on the data features, from the one or more second sub-images. The at least one first sub-image for training and the at least one second sub-image for training may be preprocessed, respectively. The at least one preprocessed first sub-image for training and/or the at least one preprocessed second sub-image for training may be designated as the plurality of first training samples, and the at least one preprocessed second sub-image for training may be designated as the plurality of second training samples. More descriptions of the obtaining of the training samples and the preprocessing may be found elsewhere in the present disclosure, for example, process 1100 and relevant descriptions thereof, which may not be repeated herein.

In some embodiments, the first training samples and the second training samples may be obtained by the process 1100.

In 1110, the processing device 110 may obtain a plurality of sample sub-images.

In some embodiments, the plurality of sample sub-images may include one or more first sub-images and one or more second sub-images. Each of the one or more first sub-images may include no sample region, and each of the one or more second sub-images may include a portion of the sample regions. For example, if the sample sub-image is obtained from a tomographic image of a chest of a patient with lung cancer, a section (e.g., a cross section) corresponding to the first sub-image may not intersect with a lung tumor of the patient with lung cancer, and a section (e.g., a cross section) corresponding to the second sub-image may intersect with the lung tumor of the patient with lung cancer.

In some embodiments, the second sub-image may include an original segmentation result of the portion of the sample regions. For example, a region where the portion of the sample regions in the second sub-image is located may be surrounded by an irregular identification frame. The irregular identification frame may be overlapped with a contour of the portion of the sample regions. As another example, a matrix with a same size as a size of the second sub-image may be used to represent the original segmentation result. A value of an element in the matrix corresponding to a pixel that does not belong to the portion of the sample regions in the second sub-image may include an identifier, such as a value of 0. A value of an element in the matrix corresponding to a pixel that belongs to the portion of the sample regions in the second sub-image may include an identifier, such as a value of 1. In some embodiments, the original segmentation result may be predetermined. For example, the portion of the sample region included in the second sub-image may be manually outlined or segmented.

In some embodiments, the sample regions may belong to a same type of target region. For example, the plurality of sample sub-images may be a plurality of tomographic images obtained after medical imaging (e.g., CT scanning imaging) of a plurality of patients with lung cancer. In some embodiments, the sample regions may belong to different types of target regions. For example, the plurality of sample sub-images may include a plurality of tomographic images obtained by medical imaging (e.g., CT scanning imaging) of a plurality of patients with different cancers (e.g., lung cancer, liver cancer, gastric cancer, etc.). A machine learning model that can segment different target regions may be obtained by training using samples generated by sample sub-images including different types of target regions.

In 1120, the processing device 110 may obtain at least one data feature of each of the plurality of sample sub-images by performing feature extraction on an image data distribution and/or a sample region distribution of the plurality of sample sub-images, respectively.

In some embodiments, the data feature of the sample sub-image may include an image data distribution feature and a sample region distribution feature related to the portion of the sample regions. The image data distribution feature may include a pixel feature value (e.g., a CT value) distribution, a size of a single pixel, an image resolution, etc. The sample region distribution feature may include an area distribution of the portion of the sample regions, a count (or number) of sample sub-images including a portion of the sample regions, a location of the portion of the sample regions in the sample sub-image, etc. The processing device 110 (e.g., a sample obtaining module) may perform the feature extraction on the image data distribution and/or the sample region distribution of the plurality of sample sub-images, respectively, using a statistical analysis algorithm (e.g., clustering, comparison, classification, etc.).

In 1130, the processing device 110 may determine at least one first sub-image for training based on the data features from the one or more first sub-images, and at least one second sub-image for training based on the data features from the one or more second sub-images.

In some embodiments, one or more images that are not suitable for model training may be removed from the plurality of sample sub-images based on the data features. For example, for a type of a target volume of tumor, target volumes of most patients may be located at a lower portion of an organ or tissue, while target volumes of only a very small number of patients may be located at an upper portion of the organ or tissue due to an individual physique. Accordingly, tomographic images of the very small number of patients may not be suitable for model training, and may be removed.

In some embodiments, the processing device 110 (e.g., the sample obtaining module) may remove the one or more images by comparing the data features to standard features. The standard features may be standard data features of the tomographic images that satisfy requirements of the model training. For example, the processing device 110 (e.g., the sample obtaining module) may remove the one or more images that are not suitable for training in the plurality of sample sub-images based on the pixel feature value (e.g., a CT value) distribution. For instance, the CT value of a normal CT image may be within a range from −1100 to 1100. If a CT value range of a sample sub-image exceeds 3000, which means there may be a serious metal artifact in the sample sub-image, and it may indicate that the sample sub-image is not suitable for training, and needs to be removed.

In some embodiments, a detection operation may be performed when the sample sub-image is determined to be removed. For example, a sample sub-image that needs to be removed may be detected. In some embodiments, the processing device 110 (e.g., the sample obtaining module) may receive a result of the detection operation of an external input. For example, the processing device 110 (e.g., the sample obtaining module) may display the result of image removal and/or a sample sub-image to be removed to a user (e.g., a doctor), and the user (e.g., the doctor) may determine whether there is a sample sub-image that satisfies the requirements of the model training but is determined to be removed. After receiving a feedback input by the user, the detection operation may be ended.

In some embodiments, after the image removal, the processing device 110 (e.g., the sample obtaining module) may determine the at least one first sub-image (e.g., a first tomographic image) for training from the one or more first sub-images, and determine the at least one second sub-image (e.g., a second tomographic image) for training from the one or more second sub-images. For example, the processing device 110 (e.g., the sample obtaining module) may determine the remaining first sub-images as the first tomographic images for training, and determine the remaining second sub-images as the second tomographic images for training.

In 1140, the processing device 110 may designate the at least one first sub-image for training and/or the at least one second sub-image for training as the plurality of first training samples, and the at least one second sub-image for training as the plurality of second training samples.

In some embodiments, the sample obtaining module may determine the plurality of first training samples and the plurality of second training samples based on the at least one first sub-image for training and/or the at least one second sub-image for training. For example, the sample obtaining module may designate the at least one first sub-image for training and/or the at least one second sub-image for training as the plurality of first training samples, and the at least one second sub-image for training as the plurality of second training samples. As another example, the sample obtaining module may designate the first tomographic images for training and/or the second tomographic images for training as the plurality of first training samples, and the second tomographic images for training as the plurality of second training samples.

In some embodiments, the sample obtaining module may preprocess the plurality of sample sub-images, respectively, so that the plurality of first training samples and the plurality of second training samples may be determined from the plurality of preprocessed sample sub-images. In some embodiments, the sample obtaining module may preprocess the at least one first sub-image for training and the at least one second sub-image for training, respectively, and designate the at least one preprocessed first sub-image for training and/or the at least one second sub-image for training as the plurality of first training samples, and designate the at least one preprocessed second sub-image for training as the plurality of second training samples. For example, the sample obtaining module may preprocess the first tomographic images for training and the second tomographic images for training, respectively, and designate the preprocessed first tomographic images for training and/or the preprocessed second tomographic images for training as the plurality of first training samples, and designate the preprocessed second tomographic images for training as the plurality of second training samples. In some embodiments, the preprocessing may at least include the image normalization, image resampling, or the like, or any combination thereof. In some embodiments, the preprocessing may at least include the image normalization. In some embodiments, each pixel point in the initial image may correspond to a physical dimension, and the image resampling may be used to resample the physical dimension (including physical dimensions along the X, Y, and/or Z directions) corresponding to each pixel point in the sample sub-image to a same size. The image normalization (or image standardization) may be used to convert an image (or sample sub-image) to be processed into a corresponding unique standard form through a series of transformations (e.g., using an invariant matrix of the image (or sample sub-image) to find or determine a set of parameters that eliminates an effect of other transformation functions on image transformation). The standard form of image (or sample sub-image) may have an invariant feature with regard to an affine translation, such as translation, rotation, zooming, etc. The image normalization may include coordinate centering, X-shearing normalization, zooming normalization, rotation normalization, etc. For example, the image normalization may include mapping an attribute (e.g., a pixel value) of each pixel of the image (or sample sub-image) to a particular section (e.g., [−1,1]) or a specific distribution (e.g., a normal distribution, a distribution with an average of 0 and a variance of 1), including min-max standardization, z-score standardization, etc. The standardized image may be suitable for a process of a machine learning model. The plurality of preprocessed sample sub-images may include uniform features (e.g., an image scale, a distribution section of pixel values, etc.).

It should be noted that the description of the process 1100 is merely for example and illustration, and not intended to limit the scope of the present disclosure. For those skilled in the art, various variations or modifications of the process 1100 may be made under the teachings of the present disclosure. However, those variations and modifications do not depart from the scope of the present disclosure.

Figure 12:
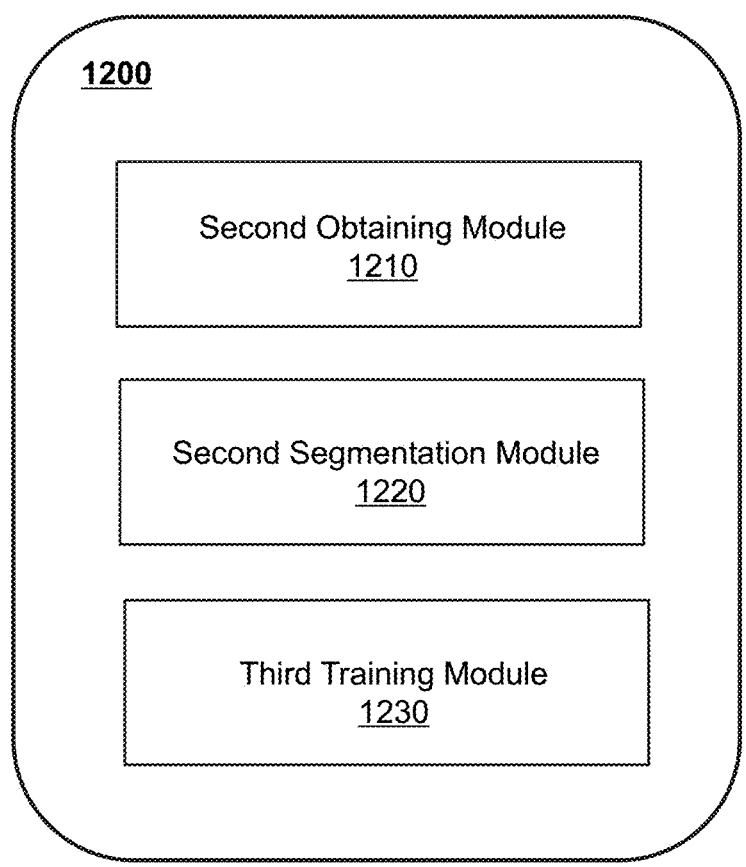
FIG. 12 is a block diagram illustrating another exemplary image segmentation system according to some embodiments of the present disclosure.

FIG. 12 is a schematic diagram illustrating an exemplary image segmentation system 1200 according to some embodiments of the present disclosure. As shown in FIG. 12, the image segmentation system 1200 may include a second obtaining module 1210, a second segmentation module 1220, and/or a third training module 1230. In some embodiments, the image segmentation system 1200 may include the second obtaining module 1210 and the second segmentation module 1220.

The second obtaining module 1210 may be configured to obtain an initial image. The second obtaining module 1210 may perform same or similar functions as the first obtaining module 410.

The second segmentation module 1220 may be configured to determine, based on the initial image, using a fusion model, at least one target image each of which including a portion of a target region, and an initial segmentation result of the portion of the target region for each of the at least one target image. The fusion model may include a machine learning model. The fusion model may be obtained by performing multi-task learning on a same network model (e.g., the above machine learning-based classification model and the above neural network-based deep learning model). The multi-task learning may include a variety of forms. For example, the multi-task learning may include a form of joint learning, a form of learning to learn, a form of learning with auxiliary tasks, or the like, or any combination thereof. As another example, the multi-task learning may include two multi-task learning modes in deep learning (i.e., hard and soft sharing of implicit parameters). The form of multi-task learning may not be limited in the present disclosure. In some embodiments, the fusion model may include a positioning sub-model and a segmentation sub-model. The positioning sub-model and the segmentation sub-model may share a portion of model weights. The second segmentation module 1220 may determine the at least one target image by classifying the plurality of sub-images of the initial image using the positioning sub-model, obtain a plurality of initial segmentation results by segmenting the plurality of sub-images using the segmentation sub-model, and obtain a second target segmentation result of the target region based on the at least one target image and the plurality of initial segmentation results.

In some embodiments, the second segmentation module 1220 may be configured to determine a target segmentation result of the target region based on the at least one second segmentation result. The second segmentation module 1220 may perform same or similar functions as the first segmentation module 430.

The third training module 1230 may be configured to train the fusion model. In some embodiments, the third training module 1230 may obtain a plurality of third training samples, and perform an iterative operation including one or more iterations based on the plurality of second training samples to obtain a trained segmentation model.

Figure 13:
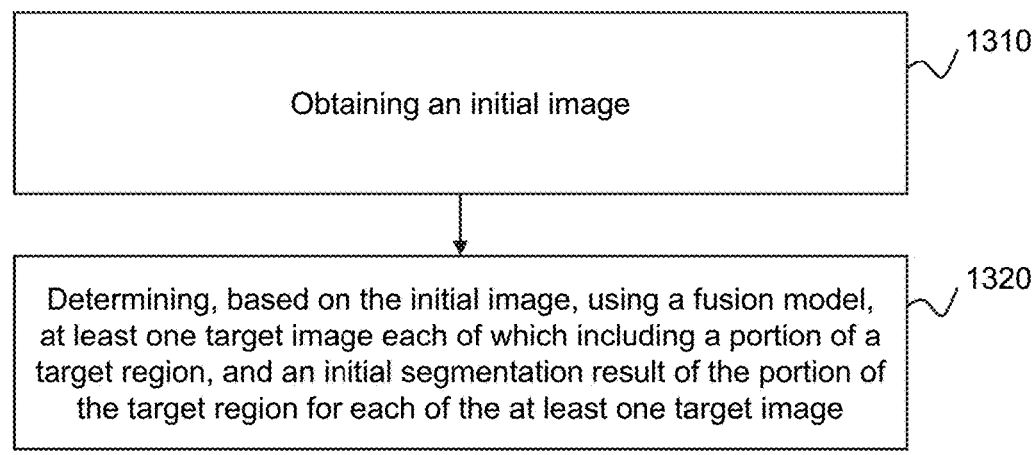
FIG. 13 is a flowchart illustrating another exemplary process for image segmentation according to some embodiments of the present disclosure.

More descriptions of the modules in FIG. 12 may be found elsewhere in the present disclosure, for example, FIG. 13 and relevant descriptions thereof.

It should be noted that the image segmentation system 1200 and its modules illustrated in FIG. 12 may be implemented via various ways. For example, in some embodiments, the image segmentation system 1200 and its modules may be implemented through hardware, software, or a combination thereof. Herein, the hardware may be implemented by a dedicated logic; the software may be stored in the storage, the image segmentation system 1200 may be executed by proper instructions, for example, by a microprocessor or a dedicated design hardware. Those skilled in the art can understand that, the methods and systems described in the present disclosure may be implemented by the executable instructions of a computer and/or by control code in the processor, for example, the code supplied in a carrier medium such as a disk, a CD, a DVD-ROM, in a programmable storage such as a read-only memory (firmware), or in a data carrier such as optical signal carrier or electric signal carrier. The image segmentation system 1200 and its modules in the present disclosure may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

It should be noted that the above descriptions of the image segmentation system 1200 and its modules are merely provided for illustration, and not intended to limit the scope of the present disclosure. Apparently, for those skilled in the art, after understanding the principle of the image segmentation system 1200, it is possible to arbitrarily combine various modules, or form a subsystem to connect with other modules without departing from this principle. For example, the second obtaining module 1210 and the second segmentation module 1220 disclosed in FIG. 12 may be different modules in a system, or one module that can realize the functions of the two modules. As another example, modules in the image segmentation system 1200 may share a storage module. Alternatively, each module may also include an own storage module. Still another example, the second obtaining module 1210 in FIG. 12 and the first obtaining module 410 in FIG. 4 may be integrated in a same module. Still another example, the second segmentation module 1220 in FIG. 12 and the first segmentation module 430 in FIG. 4 may be integrated in a same module. Such deformations do not depart from the scope of the present disclosure.

FIG. 13 is a flowchart illustrating another exemplary process for image segmentation according to some embodiments of the present disclosure. In some embodiments, the process 1300 may be implemented in the processing device 110 illustrated in FIG. 1. For example, the process 1300 may be stored in the storage device 150 and/or the storage (e.g., the storage 220, the storage 390) as a form of instructions, and invoked and/or executed by the processing device 110 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1300 may be accomplished with one or more additional operations not described, and/or without one or more of the operations discussed. Additionally, the order in which the operations of the process 1300 as illustrated in FIG. 13 and described below is not intended to be limiting.

In 1310, the processing device 110 (e.g., the second obtaining module 1210) may obtain an initial image. The operation 1310 may be performed by the second obtaining module 1210. In some embodiments, details of the operation 1310 may be similar to the operation 510 in the process 500, and may not be repeated herein.

In some embodiments, the second obtaining module 1210 may obtain a plurality of tomographic images from an imaging component or device. For example, the imaging component or device may perform image reconstruction after scanning a target subject to obtain the plurality of tomographic images. The second obtaining module 1210 may obtain the plurality of tomographic images by communicating with the imaging component or device via the network 120. In some embodiments, the second obtaining module 1210 may obtain the plurality of tomographic images from the storage device 150. For example, after obtaining the plurality of tomographic images, the imaging component or device may transmit the plurality of tomographic images to the storage device 150 for storage. The second obtaining module 1210 may obtain the plurality of tomographic images by communicating with the storage device 150 via the network 120.

In 1320, the processing device 110 (e.g., the second segmentation module 1220) may determine, based on the initial image, using a fusion model, at least one target image each of which including a portion of a target region, and an initial segmentation result of the portion of the target region for each of the at least one target image.

In some embodiments, the fusion model may include a machine learning model, such as, an artificial machine learning, or a depth learning model based on a machine learning. For example, the fusion model may be obtained based on multi-task learning.

The fusion model may include a positioning sub-model and a segmentation sub-model. The positioning sub-model and the segmentation sub-model may be with a same type. For example, the positioning sub-model and the segmentation sub-model may be a CNN or an RNN. In some embodiments, the positioning sub-model and the segmentation sub-model may share a portion of model weights or parameters. For example, a weight matrix of the positioning sub-model and a weight matrix of the segmentation sub-model may include an overlapping portion. Thus, the positioning sub-model and the divided sub-model may be used to process a same input, which can reduce a training time of the positioning sub-model and the segmentation sub-model.

In some embodiments, the second segmentation module 1220 may determine the at least one target image including the portion of the target region, and the initial segmentation result of the portion of the target region for each of the at least one target image by sequentially inputting a plurality of sub-images into the fusion model. The positioning sub-model may be configured to determine the at least one target image (also referred to as target sub-image) by classifying the plurality of sub-images of the initial image. The segmentation sub-model may be configured to obtain a plurality of initial segmentation results by segmenting the plurality of sub-images. Further, the fusion model may obtain a second target segmentation result of the target region based on the at least one target sub-image and the plurality of initial segmentation results.

For instance, the fusion model may first perform a feature extraction on the input sub-images. For example, feature extraction may be performed on a sub-image using a convolutional neural network, and a corresponding feature vector may be obtained. Subsequently, the feature vector may be simultaneously input to the positioning sub-model and the segmentation sub-model.

Figure 14:
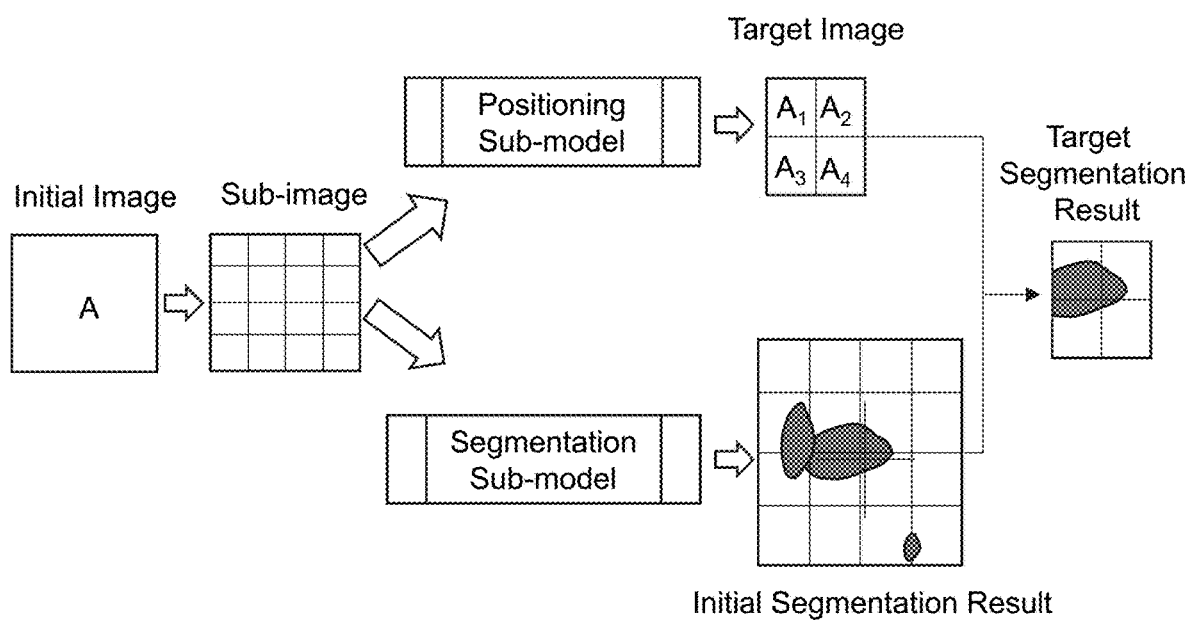
FIG. 14 is a schematic diagram illustrating an exemplary process for image segmentation according to some embodiments of the present disclosure.

The positioning sub-model may process the feature vector and output a determination result of whether the sub-image corresponding to the feature vector includes a portion of the target region. If the determination result indicates that the sub-image corresponding to the feature vector includes the portion of the target region, the sub-image may be the target image. Referring to FIG. 14, FIG. 14 is a schematic diagram illustrating an exemplary process for image segmentation according to some embodiments of the present disclosure. As shown in FIG. 14, the positioning sub-model may determine that sub-images $A_1$, $A_2$, $A_3$, and $A_4$ are target images.

The segmentation sub-model may process the feature vector, and output the initial segmentation result of the target region included in the sub-image corresponding to the feature vector. As shown in FIG. 14, the segmentation sub-model may output the initial segmentation results of all sub-images of an initial image A.

Further, the fusion model may designate a portion of the initial segmentation results that correspond to the target images as the second target segmentation result. As shown in FIG. 14, the fusion model may output the portion of the initial segmentation results corresponding to the target images $A_1$, $A_2$, $A_3$, and $A_4$ as the second target segmentation result.

In some embodiments of the present disclosure, the second target segmentation result may be determined from the initial segmentation results based on the target image output by the positioning sub-model, which can remove a segmentation result of a noise in a background region by the segmentation sub-model, thereby improving the accuracy of the segmentation.

In some embodiments, a training of the fusion model may be the same or similar to the positioning model and/or the segmentation model. For example, third training samples of the fusion model may include a plurality of preprocessed sub-images. The preprocessing may include image normalization and image resampling. Each preprocessed sub-image may further include a corresponding third sample label. For example, the third sample label may include a training label for indicating whether a portion of a sample region is included, and a training label for indicating a location or a region of the portion of the sample region in the sub-image. After the third training module 1230 inputs the plurality of preprocessed sub-images to the fusion model, the fusion model may obtain a segmentation result of the portion of the sample region in the target image. Based on differences between classification results and the third sample labels and differences between the segmentation results and the third sample labels, model parameters (e.g., the weight matrix) of the fusion model may be updated. The fusion model may be trained according to an iterative operation including one or more iterations, until a predicted segmentation result of the fusion model satisfies preset requirements. For example, the segmentation accuracy may be higher than a corresponding preset value. Accordingly, the training may be terminated, and the trained fusion model may be obtained.

In some embodiments, the process 1300 may also include an operation to obtain a target segmentation result (also referred to a second target segmentation result) of the target region in the initial image based on at least one initial segmentation result. The operation may be performed by the second segmentation module 1220. The operation may be similar to the determining of a target segmentation result of the target region based on at least one initial segmentation result in the process 500, and may not be repeated herein.

It should be noted that the description of the process 1300 is merely for example and illustration, and not intended to limit the scope of the present disclosure. For those skilled in the art, various variations or modifications of the process 1300 may be made under the teachings of the present disclosure. However, those variations and modifications do not depart from the scope of the present disclosure.

The possible beneficial effects of the embodiments of the present disclosure may include but not limited to the following. (1) In some embodiments of the present disclosure, images may be classified using a positioning model. That is, sub-images including a portion of a target region and need to be segmented can be determined first, which can reduce the computing amount of subsequent target region segmentation, thereby increasing a segmentation speed. (2) For 3D images, after determining the sub-images including the portion of the target region, a segmentation model can be generated using a 2D convolution network, which can improve the segmentation accuracy and the segmentation speed of the 3D images, and reduce calculation load. (3) For the 3D images, feature parameters can be determined based on features of the target region, a portion of sub-images can be extracted from a plurality of sub-images of the initial image based on the feature parameters, a target image can be determined based on the extracted sub-images, and finally the target region in the target image can be segmented using a 3D segmentation model, which can improve the self-adaptive ability of the 3D segmentation model for different target subjects and different target regions, and can reduce the amount of data processing of the 3D segmentation model, thereby increasing the segmentation efficiency, and improving the segmentation effect of different target regions. (4) The segmentation model can include a plurality of segmentation sub-models, and the plurality of segmentation sub-models can be adapted to different segmentation difficulties and segmentation accuracy requirements corresponding to different types of the target regions (e.g., the conventional segmentation algorithm model and/or the segmentation algorithm model in combination with a specific tool can improve a segmentation efficiency and accuracy of the target region with a regular shape and/or a clear edge, the neural network-based deep learning model can improve a segmentation efficiency and accuracy of the target region with a complex shape and/or a blurry edge), thereby improving the scope of application of the segmentation model. (5) The segmentation result of the portion of the target region, location information of the target region, and/or auxiliary positioning rules can be input to the positioning model, which can improve the accuracy of the positioning model based on a result of the segmentation model, the location information of the target region, and/or the auxiliary positioning rules, thereby improving the accuracy of segmentation.

It should be noted that different embodiments may have different beneficial effects. In different embodiments, the possible beneficial effects may be any one of the above effects, or any combination thereof, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image segmentation, which is implemented on a computing device including at least one processor and at least one storage device, comprising:
    obtaining an initial image;
    determining, based on the initial image, at least one target image using a positioning model, each of the at least one target image including a portion of a target region, and the positioning model being configured to determine whether the initial image includes a portion of the target region; and for the each of the at least one target image, determining an initial segmentation result of the portion of the target region using a segmentation model.

2. The method of claim 1, wherein the initial image is obtained based on at least one of a computed tomography (CT) scanner, a positron emission tomography (PET) scanner, or a magnetic resonance (MR) scanner.

3. The method of claim 1, wherein
the initial image includes a two-dimensional (2D) image, the at least one target image including a 2D image block of the 2D image; or
the initial image includes a 3D image, the at least one target image including a 3D image block of the 3D image.

4. The method of claim 1, wherein the positioning model includes a machine learning-based classification model.

5. The method of claim 1, wherein the segmentation model includes a neural network-based deep learning model.

6. The method of claim 1, wherein the segmentation model includes at least one of a 2D convolutional segmentation model or a 3D segmentation model.

7. The method of claim 1, further comprising:
determining a target segmentation result of the target region based on the at least one initial segmentation result.

8. The method of claim 1, wherein the positioning model is determined according to a first training process including:
obtaining a plurality of first training samples, each of the plurality of first training samples including a first sample sub-image and a first sample label, the first sample label being configured to indicate whether the first sample sub-image includes a portion of a sample region; and
training an initial positioning model according to an iterative operation including one or more iterations, and in at least one of the one or more iterations, the first training process further includes:
obtaining an updated positioning model generated in a previous iteration;
for the each of the plurality of first training samples, obtaining a determination result of whether the first sample sub-image includes the portion of the sample region using the initial positioning model; and
updating at least one first model parameter of the updated positioning model based on a first difference between the determination result and the first sample label, or designating the updated positioning model as the positioning model based on the first difference.

9. The method of claim 1, wherein the segmentation model is determined according to a second training process including:
obtaining a plurality of second training samples, each of the plurality of second training samples including a second sample sub-image and a second sample label, the second sample sub-image including a portion of a sample region, the second sample label including a sample segmentation result of the portion of the sample region; and
training an initial segmentation model according to an iterative operation including one or more iterations, and in at least one of the one or more iterations, the second training process further includes:
obtaining an updated segmentation model generated in a previous iteration;
for the each of the plurality of second training samples, obtaining a predicted segmentation result for the portion of the sample region included in the second sample sub-image using the updated segmentation model; and
updating at least one second model parameter of the updated segmentation model based on a second difference between the predicted segmentation result and the second sample label, or designating the updated segmentation model as the segmentation model based on the second difference.

10. The method of claim 1, wherein the positioning model is obtained by training based on a plurality of first training samples, the segmentation model is obtained by training based on a plurality of second training samples, and the plurality of first training samples and the plurality of second training samples are obtained based on a plurality of sample sub-images of a sample initial image.

11. The method of claim 10, wherein the plurality of first training samples and the plurality of second training samples are obtained by:
obtaining the plurality of sample sub-images, the plurality of sample sub-images including one or more first sub-images and one or more second sub-images, each of the one or more first sub-images including no sample region, each of the one or more second sub-images including a portion of the sample region and a segmentation result of the portion of the sample region;
preprocessing the plurality of sample sub-images, respectively; and
determining the plurality of first training samples and the plurality of second training samples from the plurality of preprocessed sample sub-images.

12. The method of claim 10, wherein the plurality of first training samples and the plurality of second training samples are obtained by:
obtaining the plurality of sample sub-images, the plurality of sample sub-images including one or more first sub-images and one or more second sub-images, each of the one or more first sub-images including no sample region, each of the one or more second sub-images including a portion of the sample region and a segmentation result of the portion of the sample region;
obtaining at least one data feature of each of the plurality of sample sub-images by performing feature extraction on an image data distribution and/or a sample region distribution of the plurality of sample sub-images, respectively;
determining, based on the data features, at least one first sub-image for training from the one or more first sub-images and at least one second sub-image for training from the one or more second sub-images;
preprocessing the at least one first sub-image for training and the at least one second sub-image for training, respectively, the preprocessing including at least one of image normalization or image resampling; and
designating the at least one preprocessed first sub-image for training and/or the at least one preprocessed second sub-image for training as the plurality of first training samples;
designating the at least one preprocessed second sub-image for training as the plurality of second training samples.

13. The method of claim 1, wherein the determining, based on the initial image, at least one target image using a positioning model includes:
  determining a plurality of sub-images of the initial image;
  determining the at least one target image from the plurality of sub-images using the positioning model, the positioning model being further configured to generate a determination result corresponding to each of the plurality of sub-images indicating whether the sub-image includes a portion of the target region.

14. The method of claim 13, wherein the determining the at least one target image from the plurality of sub-images using the positioning model includes:
  obtaining a plurality of preprocessed sub-images by preprocessing the plurality of sub-images, respectively, the preprocessing including at least one of image normalization or image resample; and
  determining the at least one target image from the plurality of preprocessed sub-images using the positioning model.

15. The method of claim 14, wherein the determining a plurality of sub-images of the initial image includes:
  determining at least one feature parameter based on at least one feature of the target region; and
  obtaining, based on the at least one feature parameter, the plurality of sub-images from the initial image.

16. A method for image segmentation, which is implemented on a computing device including at least one processor and at least one storage device, comprising:
  obtaining an initial image; and
  determining, based on the initial image, using a fusion model, at least one target image each of which including a portion of a target region, and an initial segmentation result of the portion of the target region for each of the at least one target image, the fusion model being obtained based on multi-task learning, wherein the fusion model includes a positioning sub-model and a segmentation sub-model, and the positioning sub-model is configured to determine the at least one target image by determining whether the initial image includes a portion of the target region.

17. The method of claim 16, wherein the fusion model includes a machine learning model.

18. The method of claim 16, wherein
  the positioning sub-model and the segmentation sub-model share a portion of model weights.

19. The method of claim 16, further comprising:
  determining a target segmentation result of the target region based on the at least one initial segmentation result.

20. A system for image segmentation, comprising:
  at least one storage device storing a set of instructions; and
  at least one processor in communication with the storage device, wherein when executing the set of instructions, the at least one processor is configured to cause the system to perform operations including:
  obtaining an initial image;
  determining, based on the initial image, at least one target image using a positioning model, each of the at least one target image including a portion of a target region, and the positioning model being configured to determine whether the initial image includes a portion of the target region; and
  for the each of the at least one target image, determining an initial segmentation result of the portion of the target region using a segmentation model.

* * * * *